US012276966B2

(12) United States Patent
Sugimoto et al.

(10) Patent No.: US 12,276,966 B2
(45) Date of Patent: Apr. 15, 2025

(54) DEVICE CONFIGURATION OBJECT TEMPLATE WITH USER INTERACTION FOR DEVICE PROPERTIES GENERATOR

(71) Applicant: Rockwell Automation Technologies, Inc., Mayfield Heights, OH (US)

(72) Inventors: Thomas Kazushige Sugimoto, Solon, OH (US); Qin Cheng Jin, Liaoning (CN); Wang Zhen, Liaoning (CN)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 392 days.

(21) Appl. No.: 17/846,165

(22) Filed: Jun. 22, 2022

(65) Prior Publication Data

US 2023/0418263 A1    Dec. 28, 2023

(51) Int. Cl.
G05B 19/41     (2006.01)
G05B 19/4155   (2006.01)

(52) U.S. Cl.
CPC ........... *G05B 19/4155* (2013.01); *G05B 2219/33125* (2013.01)

(58) Field of Classification Search
CPC ...... G05B 19/4155; G05B 2219/33125; G05B 2219/25067; G05B 19/0426
See application file for complete search history.

(56) References Cited

U.S. PATENT DOCUMENTS

| 8,750,606 | B2 | 6/2014 | Sugita |
| 9,195,477 | B1 | 11/2015 | Spencer |
| 9,389,845 | B2 | 7/2016 | Gupta et al. |
| 9,983,775 | B2 * | 5/2018 | Jain ................. G06F 9/451 |
| 2009/0019313 | A1 | 1/2009 | Pokala et al. |
| 2010/0070909 | A1 | 3/2010 | Biltz et al. |
| 2012/0124504 | A1 | 5/2012 | Maybee et al. |
| 2013/0211546 | A1 | 8/2013 | Lawson et al. |

(Continued)

FOREIGN PATENT DOCUMENTS

| EP | 2787685 A1 | 10/2014 |
| EP | 3009900 B1 | 1/2020 |
| WO | 2013012726 A2 | 1/2013 |

OTHER PUBLICATIONS

Extended European Search Report received for EP Patent Application Serial No. 23175064.7 dated Oct. 27, 2023, 8 pages.

(Continued)

*Primary Examiner* — Christopher W Carter
(74) *Attorney, Agent, or Firm* — Amin, Turocy & Watson, LLP

(57) ABSTRACT

An industrial integrated development environment (IDE) supports the use of graphical device profiles to configure device parameters as part of an industrial control project. To allow an edit to first device represented by a first device profile to be applied easily to other device profiles, the industrial IDE system can record a user's interactions with the first device profile during a session of editing the device's parameters. These interactions are recorded as a sequence of cursor movements, mouse-click selections, keystrokes, and other such interactions. The user interactions are stored as a reusable interaction record which can be selectively applied to other device profiles to recreate or replay the user interactions on those other profiles.

20 Claims, 24 Drawing Sheets

(56) References Cited

U.S. PATENT DOCUMENTS

| | | | |
|---|---|---|---|
| 2014/0337429 A1 | 11/2014 | Asenjo et al. | |
| 2016/0327925 A1 | 11/2016 | Leonelli et al. | |
| 2017/0084273 A1* | 3/2017 | Zohar | G10L 15/26 |
| 2017/0212657 A1 | 7/2017 | Burciu | |
| 2018/0088564 A1 | 3/2018 | Billi-Duran et al. | |
| 2019/0215343 A1 | 7/2019 | Rykowski et al. | |
| 2020/0206920 A1* | 7/2020 | Ma | G06Q 10/0633 |
| 2021/0003996 A1 | 1/2021 | Nagabhairava et al. | |
| 2021/0089278 A1* | 3/2021 | Dunn | G06F 8/20 |
| 2022/0066415 A1 | 3/2022 | Miller et al. | |
| 2022/0398355 A1 | 12/2022 | Idota | |

OTHER PUBLICATIONS

Extended European Search Report received for EP Patent Application Serial No. 23175343.5 dated Nov. 17, 2023, 9 pages.
Non-Final Office Action received for U.S. Appl. No. 17/846,314 dated Nov. 15, 2023 33 pages.
Final Office Action received for U.S. Appl. No. 17/846,314 dated Mar. 4, 2024, 52 pages.
Non-Final Office Action received for U.S. Appl. No. 14/675,129 dated May 4, 2017, 58 pages.
Communication Pursuant to Rule 69 EPC received for European Patent Application Serial No. 23175343.5 dated Jan. 5, 2024, 2 pages.
Communication Pursuant to Rule 69 EPC received for European Patent Application Serial No. 23175064.7 dated Jan. 5, 2024, 2 pages.
Non-Final Office Action received for U.S. Appl. No. 17/846,314 dated Jul. 10, 2024, 50 pages.
Communication pursuant to Article 94(3) EPC received for European Patent Application Serial No. 23175343.5 dated Nov. 6, 2024, 4 pages.
Notice of Allowance received for U.S. Appl. No. 17/846,314 dated Nov. 21, 2024, 38 pages.

* cited by examiner

DEVICE CONFIGURATION OBJECT TEMPLATE WITH USER INTERACTION FOR DEVICE PROPERTIES GENERATOR

BACKGROUND

The subject matter disclosed herein relates generally to industrial automation systems, and, for example, to industrial programming development platforms.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for developing industrial applications is provided, comprising a user interface component configured to render, in response to selection of a first device profile from a library of device profiles, a first device configuration interface defined by the first device profile, wherein the first device configuration interface is configured to set, based on a sequence of user interactions with the first device configuration interface, values of one or more device parameters of a first industrial device represented by the first device profile; and a device configuration component configured to record the sequence of user interactions as an interaction record, wherein the user interactions comprise at least one of a cursor movement, a selection action, or a series of keystrokes, and in response to receipt of an instruction to apply the interaction record to an instance of a second device profile, execute the sequence of user interactions on a second device configuration interface defined by the second device profile.

Also, one or more embodiments provide a method, comprising rendering, by a system comprising a processor in response to selection of a first device profile from a library of device profiles, a first device configuration interface defined by the first device profile; receiving, by the system, a sequence of user actions directed to the first device configuration interface, wherein the user interactions comprise at least one of a cursor movement, a selection action, or a series of keystrokes; setting, by the system based on a sequence of user interactions, values of one or more device parameters of a first industrial device represented by the first device profile; storing, by the system, the sequence of user interactions in an interaction record; and in response to receiving an instruction to apply the interaction record to an instance of a second device profile, recreating, by the system, the sequence of user interactions on a second device configuration interface defined by the second device profile.

Also, according to one or more embodiments, a non-transitory computer-readable medium is provided having stored thereon instructions that, in response to execution, cause a system to perform operations, the operations comprising in response to selection of a first device profile from a library of device profiles, rendering a first device configuration interface defined by the first device profile; receiving a sequence of user actions directed to the first device configuration interface, wherein the user interactions comprise at least one of a cursor movement, a selection action, or a series of keystrokes; setting, based on a sequence of user interactions, values of one or more device parameters of a first industrial device represented by the first device profile; storing the sequence of user interactions in an interaction record; and in response to receiving an instruction to apply the interaction record to an instance of a second device profile, reproducing the sequence of user interactions on a second device configuration interface defined by the second device profile.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
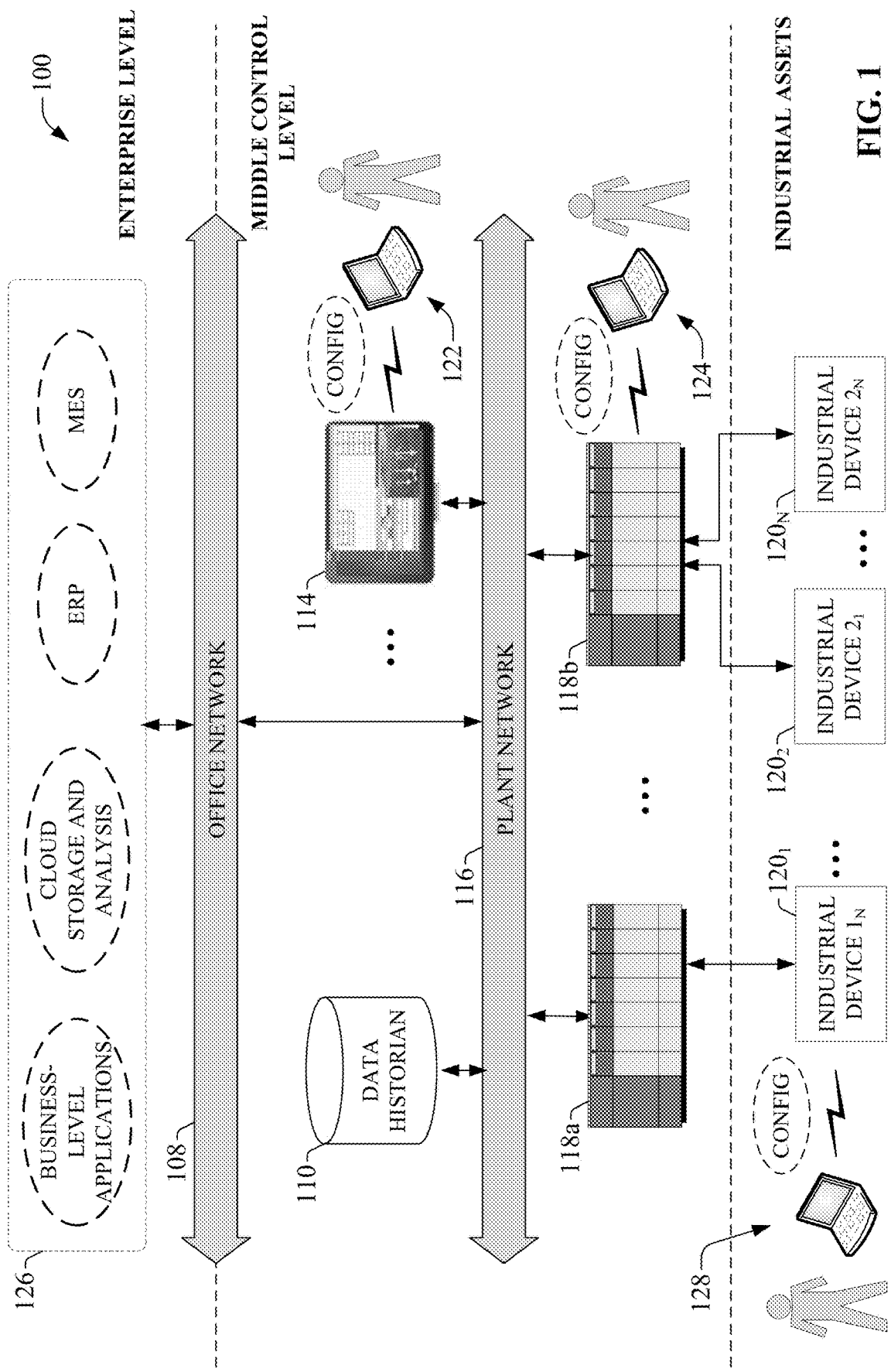
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledgebases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

The various control, monitoring, and analytical devices that make up an industrial environment must be programmed or configured using respective configuration applications specific to each device. For example, industrial controllers 118 are typically configured and programmed using a control programming development application such as a ladder logic editor (e.g., executing on a client device 124). Using such development platforms, a designer can write control programming (e.g., ladder logic, structured text, function block diagrams, etc.) for carrying out a desired industrial sequence or process and download the resulting program files to the controller 118. Separately, developers design visualization screens and associated navigation structures for HMIs 114 using an HMI development platform (e.g., executing on client device 122) and download the resulting visualization files to the HMI 114. Some industrial devices 120—such as motor drives, telemetry devices, safety input devices, etc.—may also require configuration using separate device configuration tools (e.g., executing on client device 128) that are specific to the device being configured. Such device configuration tools may be used to set device parameters or operating modes (e.g., high/low limits, output signal formats, scale factors, energy consumption modes, etc.).

The necessity of using separate configuration tools to program and configure disparate aspects of an industrial automation system results in a piecemeal design approach whereby different but related or overlapping aspects of an automation system are designed, configured, and programmed separately on different development environments. For example, a motion control system may require an industrial controller to be programmed and a control loop to be tuned using a control logic programming platform, a motor drive to be configured using another configuration platform, and an associated HMI to be programmed using a visualization development platform. Related peripheral systems—such as vision systems, safety systems, etc.—may also require configuration using separate programming or development applications.

This segregated development approach can also necessitate considerable testing and debugging efforts to ensure proper integration of the separately configured system aspects. In this regard, intended data interfacing or coordinated actions between the different system aspects may require significant debugging due to a failure to properly coordinate disparate programming efforts.

To address at least some of these or other issues, one or more embodiments described herein provide an integrated development environment (IDE) for designing, programming, and configuring multiple aspects of an industrial automation system using a common design environment and data model. Embodiments of the industrial IDE can be used to configure and manage automation system devices in a common way, facilitating integrated, multi-discipline programming of control, visualization, and other aspects of the control system.

In general, the industrial IDE supports features that span the full automation lifecycle, including design (e.g., device selection and sizing, controller programming, visualization development, device configuration, testing, etc.); installation, configuration and commissioning; operation, improvement, and administration; and troubleshooting, expanding, and upgrading.

Embodiments of the industrial IDE can include a library of modular code and visualizations that are specific to industry verticals and common industrial applications within those verticals. These code and visualization modules can simplify development and shorten the development cycle, while also supporting consistency and reuse across an industrial enterprise.

To support enhance development capabilities, projects creating using embodiments of the IDE system can be built on an object-based model rather than, or in addition to, a tag-based architecture. To this end, the IDE system can support the use of automation objects that serve as building blocks for this object-based development structure. To ensure consistency within and between projects, as well as to ensure that a given industrial project is dynamically updated to reflect changes to an industrial asset's attributes (e.g., control code, visualization definitions, testing scripts, analytic code, etc.), embodiments of the IDE system can use automation object inheritance features to propagate changes made to an automation object definition to all instances of the automation object used throughout a control project.

Additionally, some embodiments of the industrial IDE system can include device profile creation tools that extend the IDE system's capabilities by allowing users to create device profiles using an IDE-type development interface. These tools allow device vendors or end users to easily create device profiles that can be stored in a device profile library and added to automation projects as needed. Device profiles created in this manner can be used to set device configurations or parameter values for corresponding devices—e.g., controller modules, motor drives, smart devices, etc.—within the system project.

Figure 2:
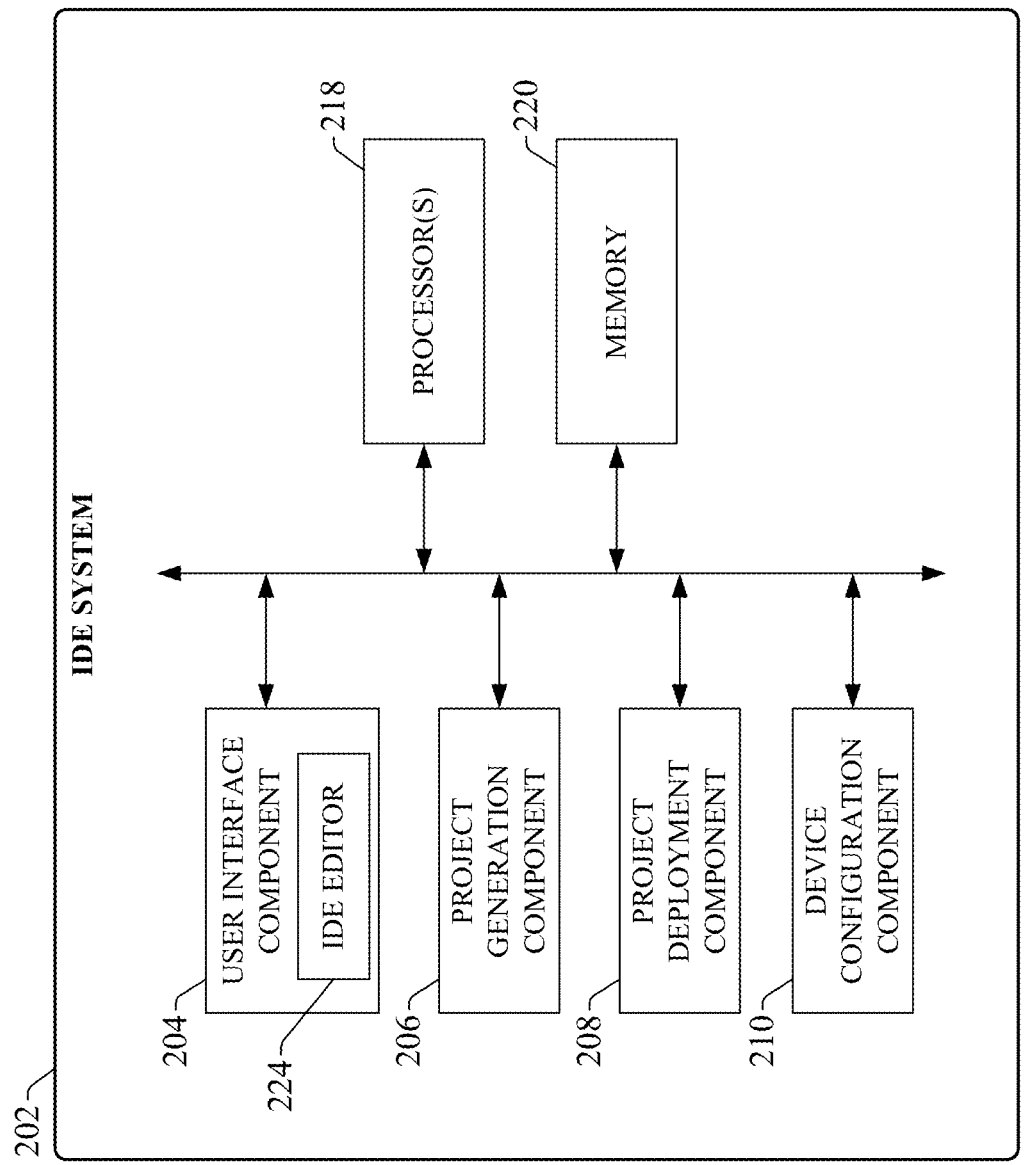
FIG. 2 is a block diagram of an example integrated development environment (IDE) system.

FIG. 2 is a block diagram of an example integrated development environment (IDE) system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IDE system 202 can include a user interface component 204 including an IDE editor 224, a project generation component 206, a project deployment component 208, a device configuration component 210, one or more processors 218, and memory 220. In various embodiments, one or more of the user interface component 204, project generation component 206, project deployment component 208, device configuration component 210, the one or more processors 218, and memory 220 can be electrically and/or communicatively coupled to one another to perform one or more of the functions of the IDE system 202. In some embodiments, components 204, 206, 208, and 210, can comprise software instructions stored on memory 220 and executed by processor(s) 218. IDE system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to receive user input and to render output to the user in any suitable format (e.g., visual, audio, tactile, etc.). In some embodiments, user interface component 204 can be configured to communicatively interface with an IDE client that executes on a client device (e.g., a laptop computer, tablet computer, smart phone, etc.) that is communicatively connected to the IDE system 202 (e.g., via a hardwired or wireless connection). The user interface component 204 can then receive user input data and render output data via the IDE client. In other embodiments, user interface component 314 can be configured to generate and serve suitable interface screens to a client device (e.g., program development screens), and exchange data via these interface screens. Input data that can be received via various embodiments of user interface component 204 can include, but is not limited to, programming code, industrial design specifications or goals, engineering drawings, AR/VR input, DSL definitions, video or image data, device configuration data, device profile definition data, or other such input. Output data rendered by various embodiments of user interface component 204 can include program code, programming feedback (e.g., error and highlighting, coding suggestions, etc.), programming and visualization development screens, project testing results, etc.

Project generation component 206 can be configured to create a system project comprising one or more project files based on design input received via the user interface component 204, as well as industrial knowledge, predefined code modules and visualizations, and automation objects 222 maintained by the IDE system 202. Project deployment component 208 can be configured to commission the system project created by the project generation component 206 to appropriate industrial devices (e.g., controllers, HMI terminals, motor drives, AR/VR systems, etc.) for execution. To this end, project deployment component 208 can identify the appropriate target devices to which respective portions of the system project should be sent for execution, translate these respective portions to formats understandable by the target devices, and deploy the translated project components to their corresponding devices.

Device configuration component 210 can be configured to monitor and record a user's interactions with a graphical device profile interface as the user is editing configuration parameter values for an industrial device, to store these recorded interactions as a sequence of user inputs (e.g., cursor movements, mouse clicks, keystrokes, etc.), and to reproduce these recorded interactions for other device profiles to facilitate reproducing the device configuration settings for other industrial devices.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
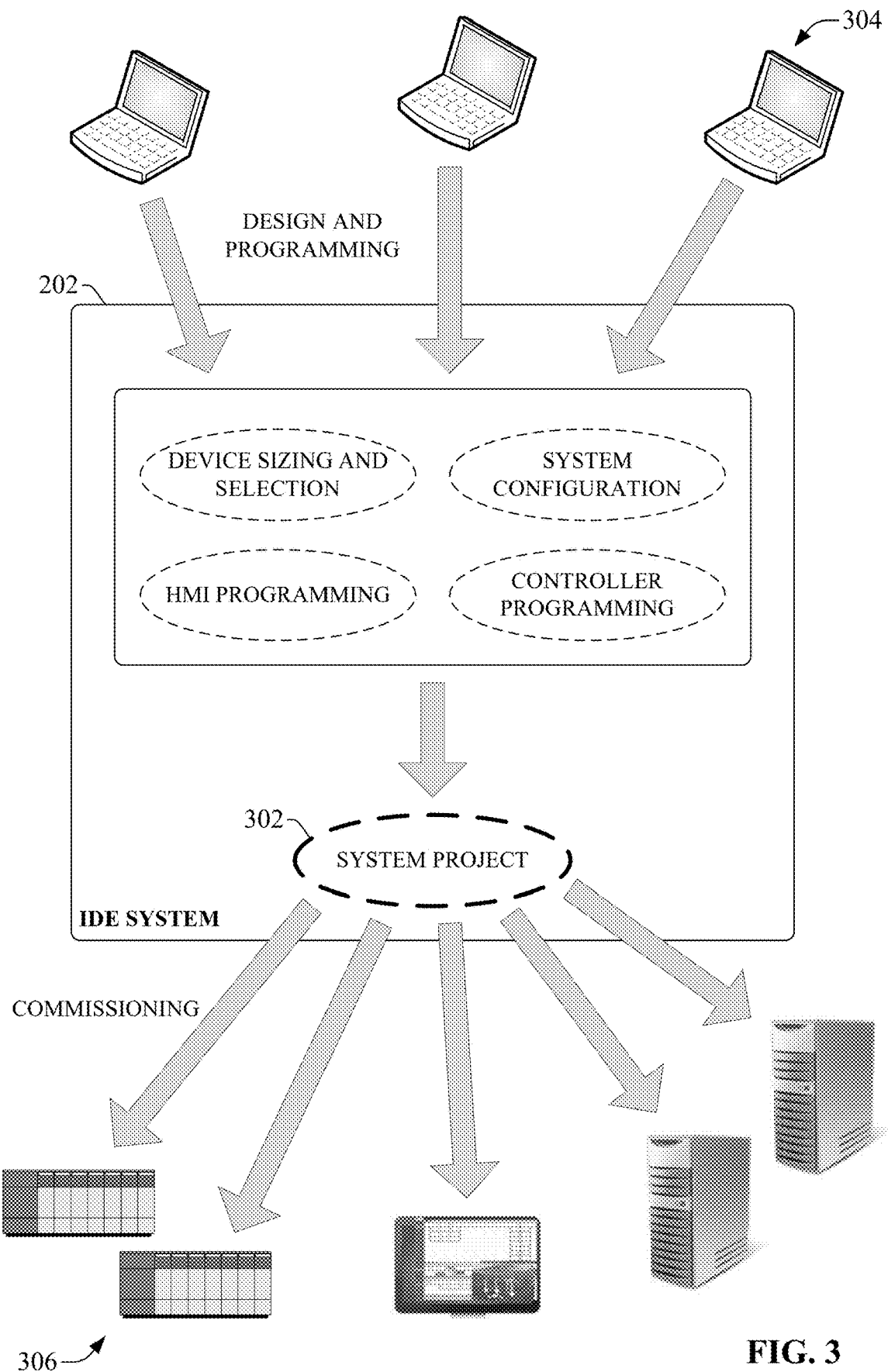
FIG. 3 is a diagram illustrating a generalized architecture of an industrial IDE system.

FIG. 3 is a diagram illustrating a generalized architecture of the industrial IDE system 202 according to one or more embodiments. Industrial IDE system 202 can implement a common set of services and workflows spanning not only design, but also commissioning, operation, and maintenance. In terms of design, the IDE system 202 can support not only industrial controller programming and HMI development, but also sizing and selection of system components, device/system configuration, AR/VR visualizations, and other features. The IDE system 202 can also include tools that simplify and automate commissioning of the resulting project and assist with subsequent administration of the deployed system during runtime.

Embodiments of the IDE system 202 that are implemented on a cloud platform also facilitate collaborative project development whereby multiple developers 304 contribute design and programming input to a common automation system project 302. Collaborative tools supported by the IDE system can manage design contributions from the multiple contributors and perform version control of the aggregate system project 302 to ensure project consistency.

Based on design and programming input from one or more developers 304, IDE system 202 generates a system project 302 comprising one or more project files. The system project 302 encodes one or more of control programming; HMI, AR, and/or VR visualizations; device or sub-system configuration data (e.g., drive parameters, vision system configurations, telemetry device parameters, safety zone definitions, etc.); or other such aspects of an industrial automation system being designed. IDE system 202 can identify the appropriate target devices 306 on which respective aspects of the system project 302 should be executed (e.g., industrial controllers, HMI terminals, variable frequency drives, safety devices, etc.), translate the system project 302 to executable files that can be executed on the respective target devices, and deploy the executable files to their corresponding target devices 306 for execution, thereby commissioning the system project 302 to the plant floor for implementation of the automation project.

Figure 4:
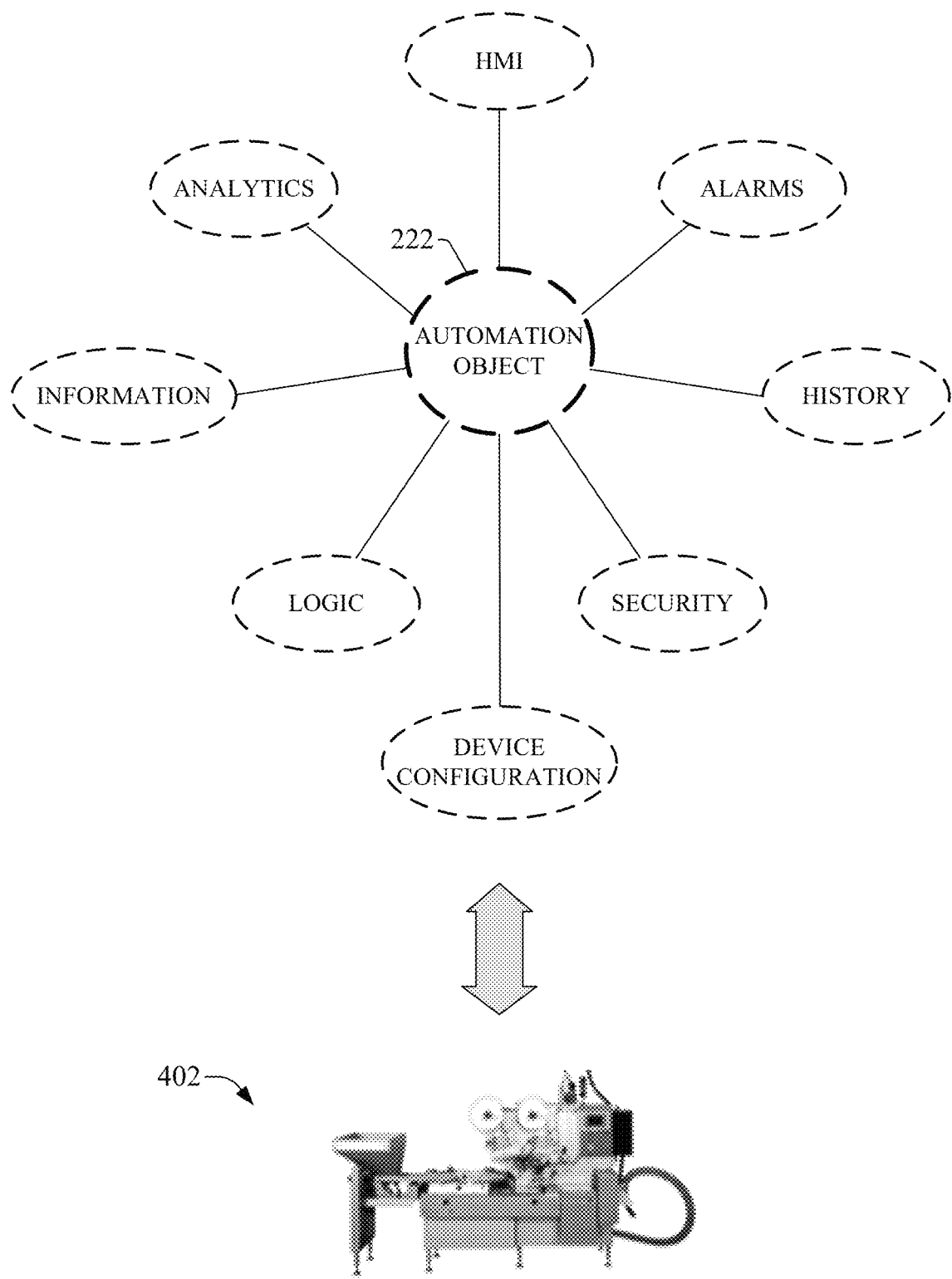
FIG. 4 is a diagram illustrating several example automation object properties that can be leveraged by an industrial IDE system in connection with building, deploying, and executing a system project.

To support enhanced development capabilities, some embodiments of IDE system 202 can be built on an object-based data model rather than, or in addition to, a tag-based architecture. Automation objects 222 serve as the building block for this object-based development architecture. FIG. 4 is a diagram illustrating several example automation object properties that can be leveraged by the IDE system 202 in connection with building, deploying, and executing a system project 302. Automation objects 222 can be created and augmented during design, integrated into larger data models, and consumed during runtime. These automation objects 222 provide a common data structure across the IDE system 202 and can be stored in an object library (e.g., part of memory 220) for reuse. The object library can store predefined automation objects 222 representing various classifications of real-world industrial assets 402, including but not limited to pumps, tanks, values, motors, motor drives (e.g., variable frequency drives), industrial robots, actuators (e.g., pneumatic or hydraulic actuators), or other such assets. Automation objects 222 can represent elements at substantially any level of an industrial enterprise, including individual devices, machines made up of many industrial devices and components (some of which may be associated with their own automation objects 222), and entire production lines or process control systems.

An automation object 222 for a given type of industrial asset can encode such aspects as 2D or 3D visualizations, alarms, control coding (e.g., logic or other type of control programming), analytics, startup procedures, testing protocols and scripts, validation reports, simulations, schematics, security protocols, and other such properties associated with the industrial asset 402 represented by the object 222. As will be described in more detail herein, an automation object 222 can also store device configuration settings for an industrial device as a sequence of mouse and keystroke interactions with a device profile configuration interface, such that these interactions can be played back to facilitate reproducing the device configuration for another device. Automation objects 222 can also be geotagged with location information identifying the location of the associated asset. During runtime of the system project 302, the automation object 222 corresponding to a given real-world asset 402 can also record status or operational history data for the asset. In general, automation objects 222 serve as programmatic representations of their corresponding industrial assets 402, and can be incorporated into a system project 302 as elements of control code, a 2D or 3D visualization, a knowledgebase or maintenance guidance system for the industrial assets, or other such aspects.

Figure 5:
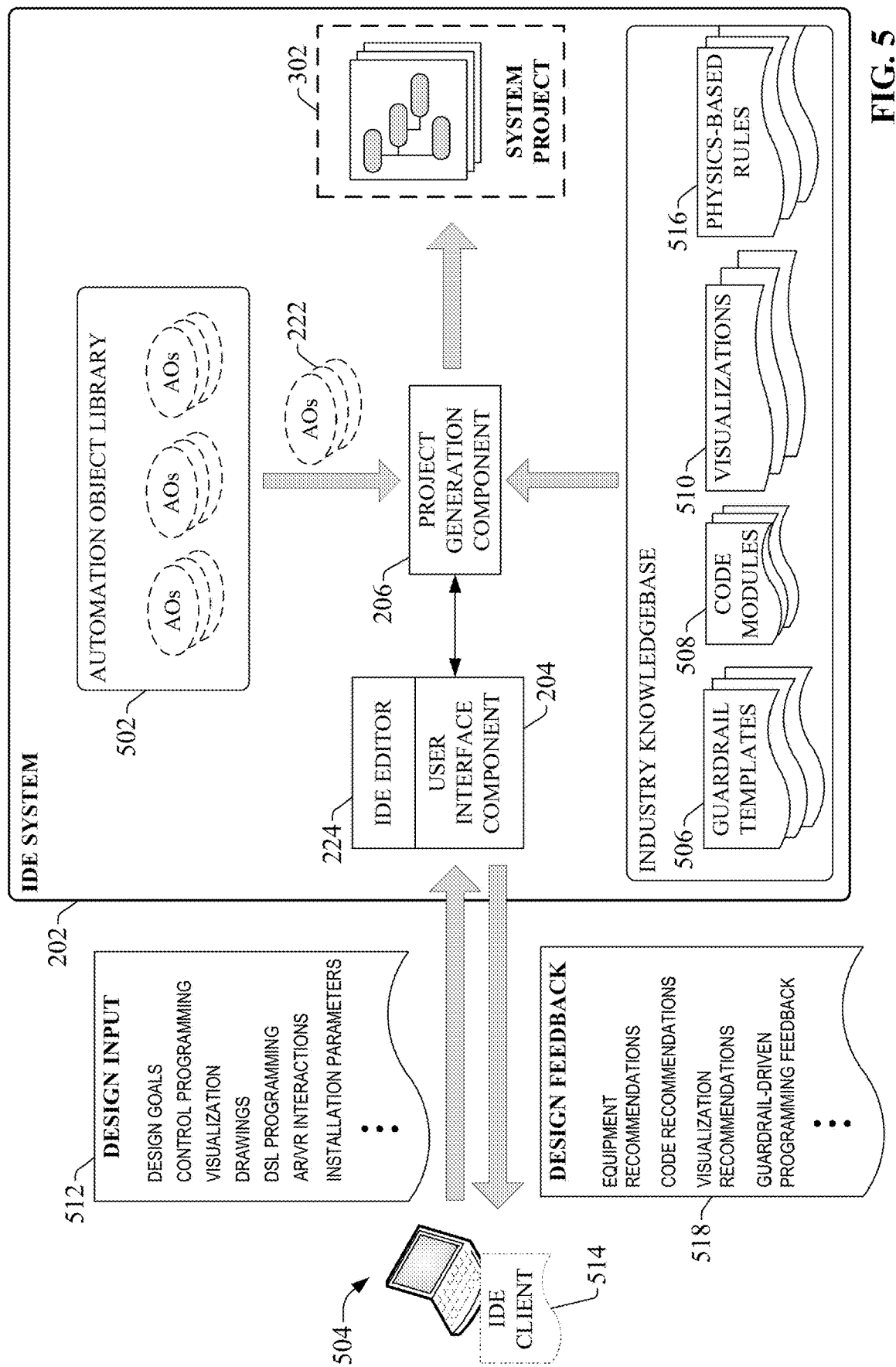
FIG. 5 is a diagram illustrating example data flows associated with creation of a system project for an automation system being designed using and industrial IDE system.

FIG. 5 is a diagram illustrating example data flows associated with creation of a system project 302 for an automation system being designed using IDE system 202 according to one or more embodiments. A client device 504 (e.g., a laptop computer, tablet computer, desktop computer, mobile device, wearable AR/VR appliance, etc.) executing an IDE client application 514 can access the IDE system's project development tools and leverage these tools to create a comprehensive system project 302 for an automation system being developed. Through interaction with the system's user interface component 204, developers can submit design input 512 to the IDE system 202 in various supported formats, including industry-specific control programming (e.g., control logic, structured text, sequential function charts, etc.) and HMI screen configuration input. Based on this design input 512 and information stored in an industry knowledgebase (predefined code modules 508 and visualizations 510, guardrail templates 506, physics-based rules 516, etc.), user interface component 204 renders design feedback 518 designed to assist the developer in connection with developing a system project 302 for configuration, control, and visualization of an industrial automation system.

In addition to control programming and visualization definitions, some embodiments of IDE system 202 can be configured to receive digital engineering drawings (e.g., computer-aided design (CAD) files) as design input 512. In such embodiments, project generation component 206 can generate portions of the system project 302—e.g., by automatically generating control and/or visualization code—based on analysis of existing design drawings. Drawings that can be submitted as design input 512 can include, but are not limited to, P&ID drawings, mechanical drawings, flow diagrams, or other such documents. For example, a P&ID drawing can be imported into the IDE system 202, and project generation component 206 can identify elements (e.g., tanks, pumps, etc.) and relationships therebetween conveyed by the drawings. Project generation component 206 can associate or map elements identified in the drawings with appropriate automation objects 222 corresponding to these elements (e.g., tanks, pumps, etc.) and add these automation objects 222 to the system project 302. The device-specific and asset-specific automation objects 222 include suitable code and visualizations to be associated with the elements identified in the drawings. In general, the IDE system 202 can examine one or more different types of drawings (mechanical, electrical, piping, etc.) to determine relationships between devices, machines, and/or assets (including identifying common elements across different drawings) and intelligently associate these elements with appropriate automation objects 222, code modules 508, and/or visualizations 510. The IDE system 202 can leverage physics-based rules 516 as well as pre-defined code modules 508 and visualizations 510 as necessary in connection with generating code or project data for system project 302.

The IDE system 202 can also determine whether pre-defined visualization content is available for any of the objects discovered in the drawings and generate appropriate HMI screens or AR/VR content for the discovered objects based on these pre-defined visualizations. To this end, the IDE system 202 can store industry-specific, asset-specific, and/or application-specific visualizations 510 that can be accessed by the project generation component 206 as needed. These visualizations 510 can be classified according to industry or industrial vertical (e.g., automotive, food and drug, oil and gas, pharmaceutical, etc.), type of industrial asset (e.g., a type of machine or industrial device), a type of industrial application (e.g., batch processing, flow control, web tension control, sheet metal stamping, water treatment, etc.), or other such categories. Predefined visualizations 510 can comprise visualizations in a variety of formats, including but not limited to HMI screens or windows, mashups that aggregate data from multiple pre-specified sources, AR overlays, VR objects representing 3D virtualizations of the associated industrial asset, or other such visualization formats. IDE system 202 can select a suitable visualization for a given object based on a predefined association between the object type and the visualization content.

Also, or in addition, some embodiments of IDE system 202 can support goal-based automated programming. For example, the user interface component 204 can allow the user to specify production goals for an automation system being designed (e.g., specifying that a bottling plant being designed must be capable of producing at least 5000 bottles per second during normal operation) and any other relevant design constraints applied to the design project (e.g., budget limitations, available floor space, available control cabinet space, etc.). Based on this information, the project generation component 206 will generate portions of the system project 302 to satisfy the specified design goals and constraints. Portions of the system project 302 that can be generated in this manner can include, but are not limited to, device and equipment selections (e.g., definitions of how many pumps, controllers, stations, conveyors, drives, or other assets will be needed to satisfy the specified goal), associated device configurations (e.g., tuning parameters, network settings, drive parameters, etc.), control coding, or HMI screens suitable for visualizing the automation system being designed.

Some embodiments of the project generation component 206 can also generate at least some of the project code for system project 302 based on knowledge of parts that have been ordered for the project being developed. This can involve accessing the customer's account information maintained by an equipment vendor to identify devices that have been purchased for the project. Based on this information the project generation component 206 can add appropriate automation objects 222 and associated code modules 508 corresponding to the purchased assets, thereby providing a starting point for project development.

Some embodiments of project generation component 206 can also monitor customer-specific design approaches for commonly programmed functions (e.g., pumping applications, batch processes, palletizing operations, etc.) and generate recommendations for design modules (e.g., code modules 508, visualizations 510, etc.) that the user may wish to incorporate into a current design project based on an inference of the designer's goals and learned approaches to achieving the goal. To this end, some embodiments of project generation component 206 can be configured to monitor design input 512 over time and, based on this monitoring, learn correlations between certain design actions (e.g., addition of certain code modules or snippets to design projects, selection of certain visualizations, etc.) and types of industrial assets, industrial sequences, or industrial processes being designed. Project generation component 206 can record these learned correlations and generate recommendations during subsequent project development sessions based on these correlations. For example, if project generation component 206 determines, based on analysis of design input 512, that a designer is currently developing a control project involving a type of industrial equipment that has been programmed and/or visualized in the past in a repeated, predictable manner, the project generation component 206 can instruct user interface component 204 to render recommended development steps or code modules 508 the designer may wish to incorporate into the system project 302 based on how this equipment was configured and/or programmed in the past.

In some embodiments, IDE system 202 can also store and implement guardrail templates 506 that define design guardrails intended to ensure the project's compliance with internal or external design standards. Based on design parameters defined by one or more selected guardrail templates 506, user interface component 204 can provide, as a subset of design feedback 518, dynamic recommendations or other types of feedback designed to guide the developer in a manner that ensures compliance of the system project 302 with internal or external requirements or standards (e.g., certifications such as TUV certification, in-house design standards, industry-specific or vertical-specific design standards, etc.). This feedback 518 can take the form of text-based recommendations (e.g., recommendations to rewrite an indicated portion of control code to comply with a defined programming standard), syntax highlighting, error highlighting, auto-completion of code snippets, or other such formats. In this way, IDE system 202 can customize design feedback 518—including programming recommendations, recommendations of predefined code modules 508 or visualizations 510, error and syntax highlighting, etc.—in accordance with the type of industrial system being developed and any applicable in-house design standards.

Guardrail templates 506 can also be designed to maintain compliance with global best practices applicable to control programming or other aspects of project development. For example, user interface component 204 may generate and render an alert if a developer's control programing is deemed to be too complex as defined by criteria specified by one or more guardrail templates 506. Since different verticals (e.g., automotive, pharmaceutical, oil and gas, food and drug, marine, etc.) must adhere to different standards and certifications, the IDE system 202 can maintain a library of guardrail templates 506 for different internal and external standards and certifications, including customized user-specific guardrail templates 506. These guardrail templates 506 can be classified according to industrial vertical, type of industrial application, plant facility (in the case of custom in-house guardrail templates 506) or other such categories. During development, project generation component 206 can select and apply a subset of guardrail templates 506 determined to be relevant to the project currently being developed, based on a determination of such aspects as the industrial vertical to which the project relates, the type of industrial application being programmed (e.g., flow control, web tension control, a certain batch process, etc.), or other such aspects. Project generation component 206 can leverage guardrail templates 506 to implement rules-based programming, whereby programming feedback (a subset of design feedback 518) such as dynamic intelligent autocorrection, type-aheads, or coding suggestions are rendered based on encoded industry expertise and best practices (e.g., identifying inefficiencies in code being developed and recommending appropriate corrections).

Users can also run their own internal guardrail templates 506 against code provided by outside vendors (e.g., OEMs) to ensure that this code complies with in-house programming standards. In such scenarios, vendor-provided code can be submitted to the IDE system 202, and project generation component 206 can analyze this code in view of in-house coding standards specified by one or more custom guardrail templates 506. Based on results of this analysis, user interface component 204 can indicate portions of the vendor-provided code (e.g., using highlights, overlaid text, etc.) that do not conform to the programming standards set forth by the guardrail templates 506, and display suggestions for modifying the code in order to bring the code into compliance. As an alternative or in addition to recommending these modifications, some embodiments of project generation component 206 can be configured to automatically modify the code in accordance with the recommendations to bring the code into conformance.

In making coding suggestions as part of design feedback 518, project generation component 206 can invoke selected code modules 508 stored in a code module database or selected automation objects 222 stored in an automation object library 502 (e.g., on memory 220). Code modules 508 comprise standardized coding segments for controlling common industrial tasks or applications (e.g., palletizing, flow control, web tension control, pick-and-place applications, conveyor control, etc.). Similarly, automation objects 222 representing respective industrial assets may have associated therewith standardize control code for monitoring and controlling their respective assets. In some embodiments, code modules 508 and/or automation objects 222 can be categorized according to one or more of an industrial vertical (e.g., automotive, food and drug, oil and gas, textiles, marine, pharmaceutical, etc.), an industrial application, or a type of machine or device to which the code module 508 or automation object 222 is applicable.

In some embodiments, project generation component 206 can infer a programmer's current programming task or design goal based on programmatic input being provided by the programmer (as a subset of design input 512), and determine, based on this task or goal, whether one of the pre-defined code modules 508 or automation objects 222 may be appropriately added to the control program being developed to achieve the inferred task or goal. For example, project generation component 206 may infer, based on analysis of design input 512, that the programmer is currently developing control code for transferring material from a first tank to another tank, and in response, recommend inclusion of a predefined code module 508 comprising standardized or frequently utilized code for controlling the valves, pumps, or other assets necessary to achieve the material transfer. Similarly, the project generation component 206 may recommend inclusion of an automation object 222 representing one of the tanks, or one of the other industrial assets involved in transferring the material (e.g., a valve, a pump, etc.), where the recommended automation object 222 includes associated control code for controlling its associated asset as well as a visualization object that can be used to visualize the asset on an HMI application or another visualization application.

Customized guardrail templates 506 can also be defined to capture nuances of a customer site that should be taken into consideration in the project design. For example, a guardrail template 506 could record the fact that the automation system being designed will be installed in a region where power outages are common, and will factor this consideration when generating design feedback 518; e.g., by recommending implementation of backup uninterruptable power supplies and suggesting how these should be incorporated, as well as recommending associated programming or control strategies that take these outages into account.

IDE system 202 can also use guardrail templates 506 to guide user selection of equipment or devices for a given design goal; e.g., based on the industrial vertical, type of control application (e.g., sheet metal stamping, die casting, palletization, conveyor control, web tension control, batch processing, etc.), budgetary constraints for the project, physical constraints at the installation site (e.g., available floor, wall or cabinet space; dimensions of the installation space; etc.), equipment already existing at the site, etc. Some or all of these parameters and constraints can be provided as design input 512, and user interface component 204 can render the equipment recommendations as a subset of design feedback 518. In conjunction with this equipment recommendation, the project generation component 206 can also recommend inclusion of corresponding automation objects 222 representing the recommended equipment for inclusion in the system project 302.

In some embodiments, project generation component 206 can also determine whether some or all existing equipment can be repurposed for the new control system being designed. For example, if a new bottling line is to be added to a production area, there may be an opportunity to leverage existing equipment since some bottling lines already exist. The decision as to which devices and equipment can be reused will affect the design of the new control system. Accordingly, some of the design input 512 provided to the IDE system 202 can include specifics of the customer's existing systems within or near the installation site. In some embodiments, project generation component 206 can apply artificial intelligence (AI) or traditional analytic approaches to this information to determine whether existing equipment specified in design in put 512 can be repurposed or leveraged. Based on results of this analysis, project generation component 206 can generate, as design feedback 518, a list of any new equipment that may need to be purchased based on these decisions.

In some embodiments, IDE system 202 can offer design recommendations based on an understanding of the physical environment within which the automation system being designed will be installed. To this end, information regarding the physical environment can be submitted to the IDE system 202 (as part of design input 512) in the form of 2D or 3D images or video of the plant environment. This environmental information can also be obtained from an existing digital twin of the plant, or by analysis of scanned environmental data obtained by a wearable AR appliance in some embodiments. Project generation component 206 can analyze this image, video, or digital twin data to identify physical elements within the installation area (e.g., walls, girders, safety fences, existing machines and devices, etc.) and physical relationships between these elements. This can include ascertaining distances between machines, lengths of piping runs, locations and distances of wiring harnesses or cable trays, etc. Based on results of this analysis, project generation component 206 can add context to schematics generated as part of system project 302, generate recommendations regarding optimal locations for devices or machines (e.g., recommending a minimum separation between power and data cables), or make other refinements to the system project 302. At least some of this design data can be generated based on physics-based rules 516, which can be referenced by project generation component 206 to determine such physical design specifications as minimum safe distances from hazardous equipment (which may also factor into determining suitable locations for installation of safety devices relative to this equipment, given expected human or vehicle reaction times defined by the physics-based rules 516), material selections capable of withstanding expected loads, piping configurations and tuning for a specified flow control application, wiring gauges suitable for an expected electrical load, minimum distances between signal wiring and electromagnetic field (EMF) sources to ensure negligible electrical interference on data signals, or other such design features that are dependent on physical rules.

In an example use case, relative locations of machines and devices specified by physical environment information submitted to the IDE system 202 can be used by the project generation component 206 to generate design data for an industrial safety system. For example, project generation component 206 can analyze distance measurements between safety equipment and hazardous machines and, based on these measurements, determine suitable placements and configurations of safety devices and associated safety controllers that ensure the machine will shut down within a sufficient safety reaction time to prevent injury (e.g., in the event that a person runs through a light curtain).

Figure 6:
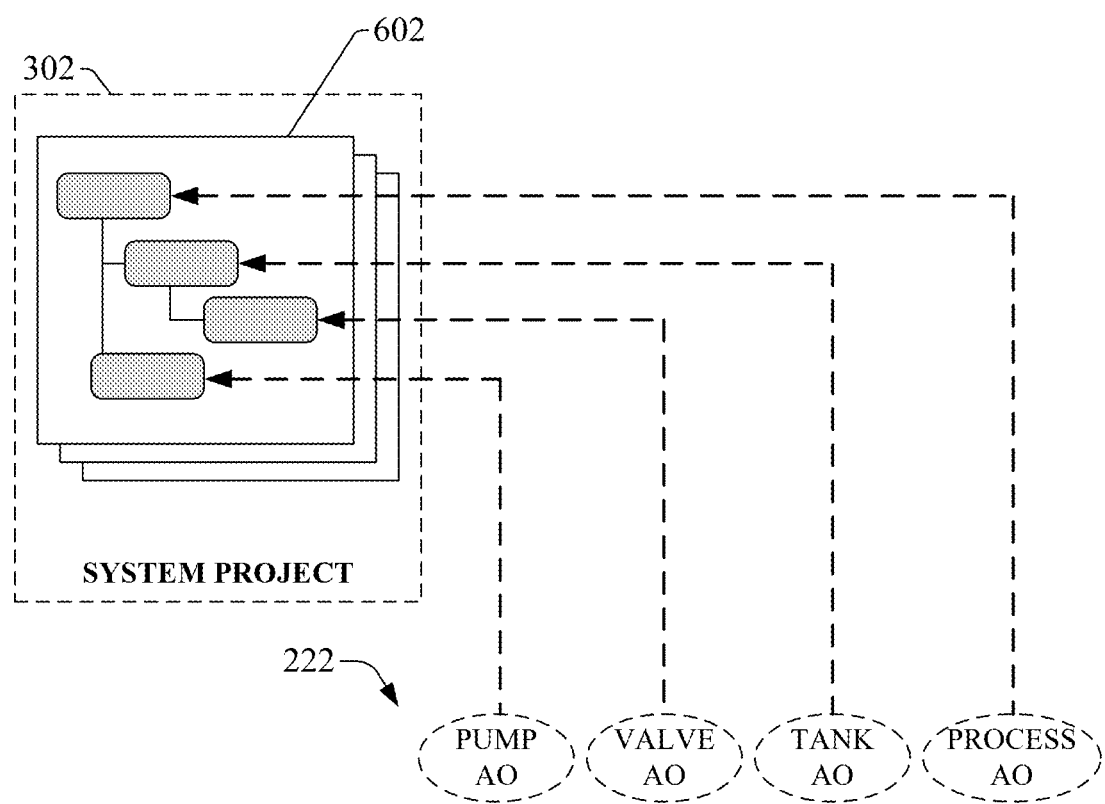
FIG. 6 is a diagram illustrating an example system project that incorporates automation objects into a project model.

As noted above, the system project 302 generated by IDE system 202 for a given automaton system being designed can be built upon an object-based architecture that uses automation objects 222 as building blocks. FIG. 6 is a diagram illustrating an example system project 302 that incorporates automation objects 222 into the project model. In this example, various automation objects 222 representing analogous industrial devices, systems, or assets of an automation system (e.g., a process, tanks, valves, pumps, etc.) have been incorporated into system project 302 as elements of a larger project data model 602. The project data model 602 also defines hierarchical relationships between these automation objects 222. According to an example relationship, a process automation object representing a batch process may be defined as a parent object to a number of child objects representing devices and equipment that carry out the process, such as tanks, pumps, and valves. Each automation object 222 has associated therewith object properties or attributes specific to its corresponding industrial asset (e.g., those discussed above in connection with FIG. 4), including executable control programming for controlling the asset (or for coordinating the actions of the asset with other industrial assets) and visualizations that can be used to render relevant information about the asset during runtime.

At least some of the attributes of each automation object 222 are default properties defined by the IDE system 202 based on encoded industry expertise pertaining to the asset represented by the objects. These default properties can include, for example, industry-standard or recommended control code for monitoring and controlling the asset represented by the automation object 222, a 2D or 3D graphical object that can be used to visualize operational or statistical data for the asset, alarm conditions associated with the asset, analytic or reporting scripts designed to yield actionable insights into the asset's behavior, or other such properties. Other properties can be modified or added by the developer as needed (via design input 512) to customize the automation object 222 for the particular asset and/or industrial application for which the system projects 302 is being developed. This can include, for example, associating customized control code, HMI screens, AR presentations, or help files associated with selected automation objects 222. In this way, automation objects 222 can be created and augmented as needed during design for consumption or execution by target control devices during runtime.

Figure 7:
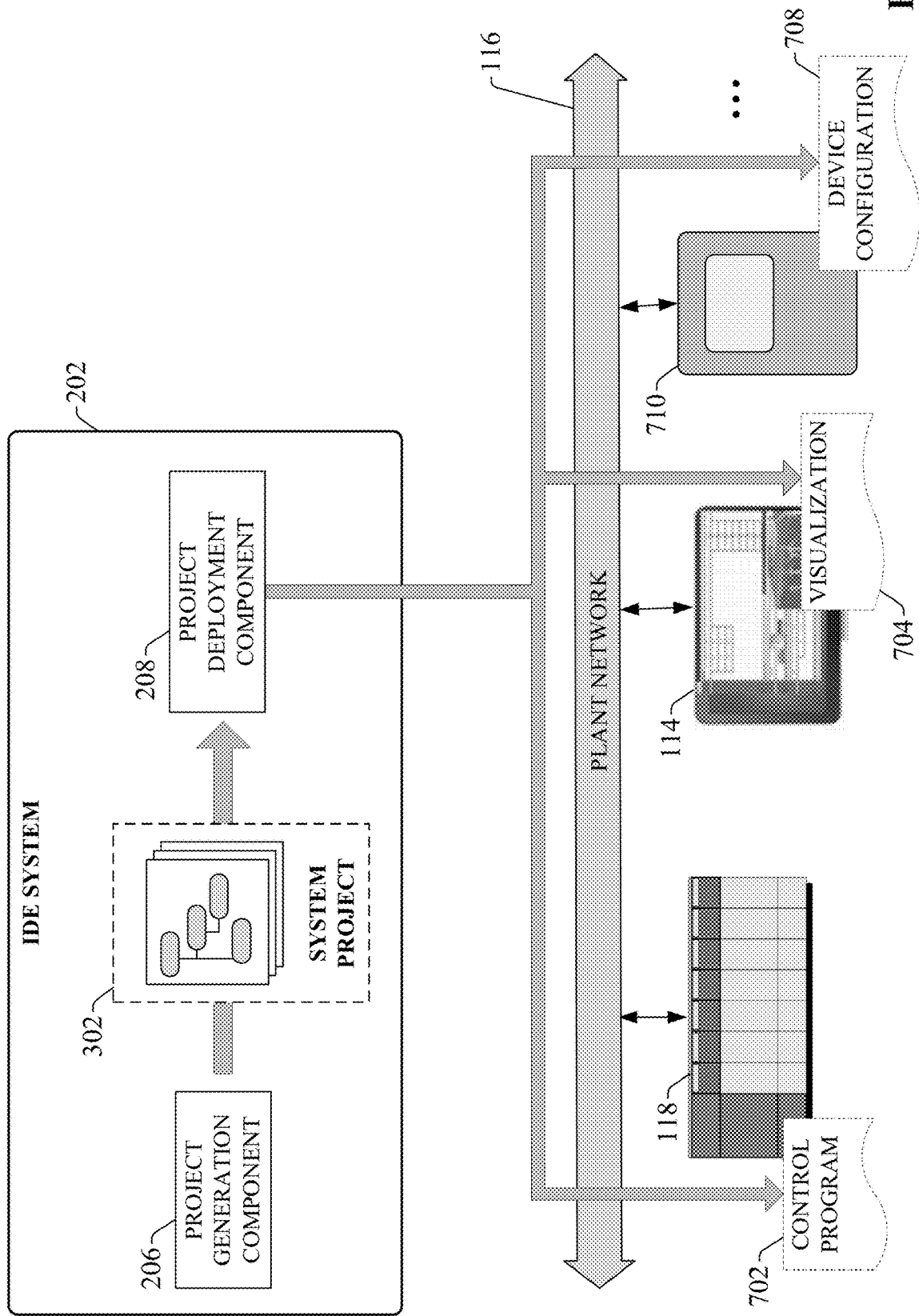
FIG. 7 is a diagram illustrating commissioning of a system project.

Once development and testing on a system project 302 has been completed, commissioning tools supported by the IDE system 202 can simplify the process of commissioning the project in the field. When the system project 302 for a given automation system has been completed, the system project 302 can be deployed to one or more target control devices for execution. FIG. 7 is a diagram illustrating commissioning of a system project 302. Project deployment component 208 can compile or otherwise translate a completed system project 302 into one or more executable files or configuration files that can be stored and executed on respective target industrial devices of the automation system (e.g., industrial controllers 118, HMI terminals 114 or other types of visualization systems, motor drives 710, telemetry devices, vision systems, safety relays, etc.).

Conventional control program development platforms require the developer to specify the type of industrial controller (e.g., the controller's model number) on which the control program will run prior to development, thereby binding the control programming to a specified controller. Controller-specific guardrails are then enforced during program development which limit how the program is developed given the capabilities of the selected controller. By contrast, some embodiments of the IDE system 202 can abstract project development from the specific controller type, allowing the designer to develop the system project 302 as a logical representation of the automation system in a manner that is agnostic to where and how the various control aspects of system project 302 will run. Once project development is complete and system project 302 is ready for commissioning, the user can specify (via user interface component 204) target devices on which respective aspects of the system project 302 are to be executed. In response, an allocation engine of the project deployment component 208 will translate aspects of the system project 302 to respective executable files formatted for storage and execution on their respective target devices.

For example, system project 302 may include—among other project aspects—control code, visualization screen definitions, and motor drive parameter definitions. Upon completion of project development, a user can identify which target devices—including an industrial controller 118, an HMI terminal 114, and a motor drive 710—are to execute or receive these respective aspects of the system project 302. Project deployment component 208 can then translate the controller code defined by the system project 302 to a control program file 702 formatted for execution on the specified industrial controller 118 and send this control program file 702 to the controller 118 (e.g., via plant network 116). Similarly, project deployment component 208 can translate the visualization definitions and motor drive parameter definitions to a visualization application 704 and a device configuration file 708, respectively, and deploy these files to their respective target devices for execution and/or device configuration.

In general, project deployment component 208 performs any conversions necessary to allow aspects of system project 302 to execute on the specified devices. Any inherent relationships, handshakes, or data sharing defined in the system project 302 are maintained regardless of how the various elements of the system project 302 are distributed. In this way, embodiments of the IDE system 202 can decouple the project from how and where the project is to be run. This also allows the same system project 302 to be commissioned at different plant facilities having different subsets of control equipment. That is, some embodiments of the IDE system 202 can allocate project code to different target devices as a function of the particular devices found on-site. IDE system 202 can also allow some portions of the project file to be commissioned as an emulator or on a cloud-based controller.

As an alternative to having the user specify the target control devices to which the system project 302 is to be deployed, some embodiments of IDE system 202 can actively connect to the plant network 116 and discover available devices, ascertain the control hardware architecture present on the plant floor, infer appropriate target devices for respective executable aspects of system project 302, and deploy the system project 302 to these selected target devices. As part of this commissioning process, IDE system 202 can also connect to remote knowledgebases (e.g., web-based or cloud-based knowledgebases) to determine which discovered devices are out of date or require firmware upgrade to properly execute the system project 302. In this way, the IDE system 202 can serve as a link between device vendors and a customer's plant ecosystem via a trusted connection in the cloud.

Copies of system project 302 can be propagated to multiple plant facilities having varying equipment configurations using smart propagation, whereby the project deployment component 208 intelligently associates project components with the correct industrial asset or control device even if the equipment on-site does not perfectly match the defined target (e.g., if different pump types are found at different sites). For target devices that do not perfectly match the expected asset, project deployment component 208 can calculate the estimated impact of running the system project 302 on non-optimal target equipment and generate warnings or recommendations for mitigating expected deviations from optimal project execution.

Figure 8:
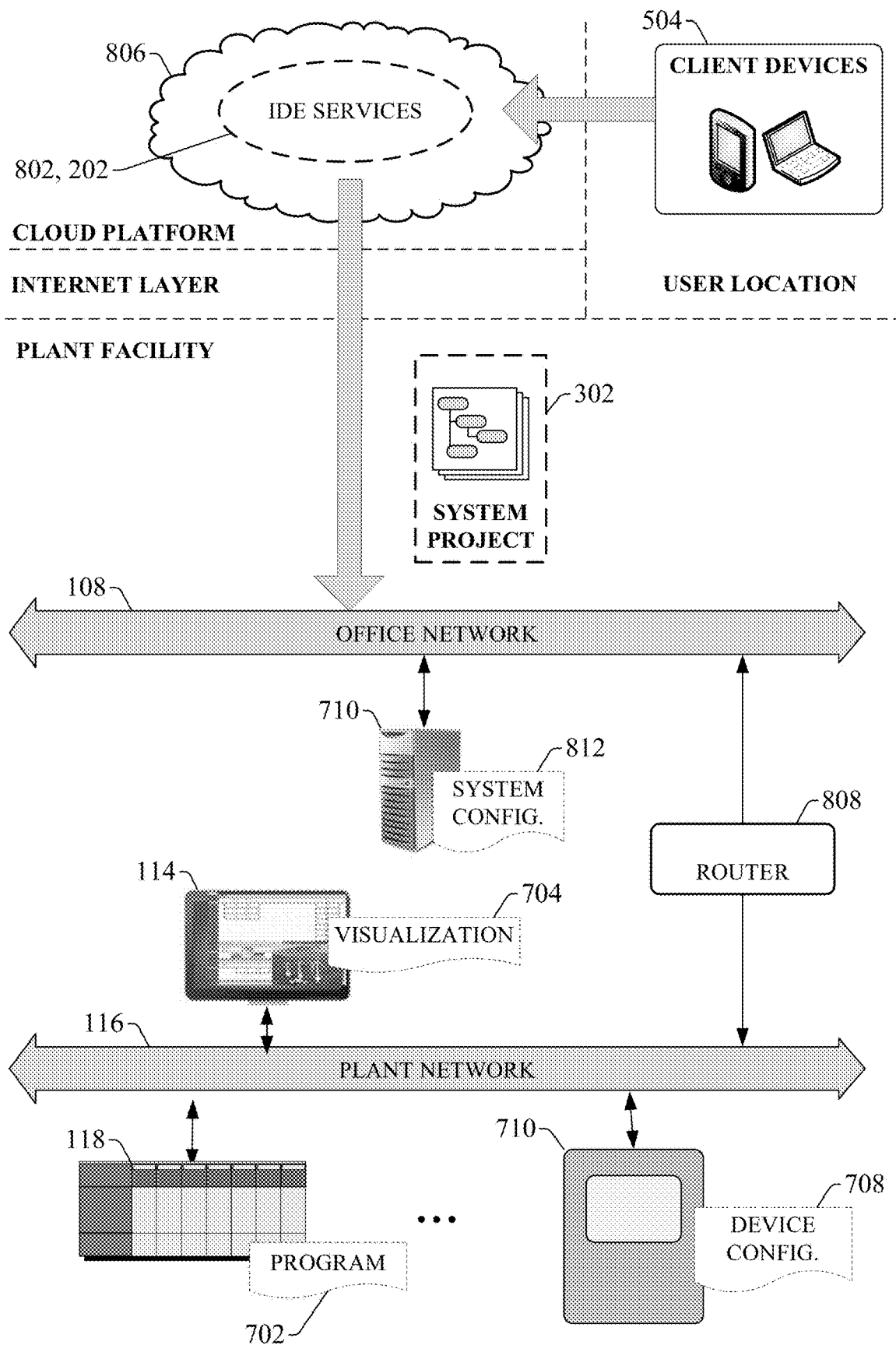
FIG. 8 is a diagram illustrating an example architecture in which cloud-based IDE services are used to develop and deploy industrial applications to a plant environment.

As noted above, some embodiments of IDE system 202 can be embodied on a cloud platform. FIG. 8 is a diagram illustrating an example architecture in which cloud-based IDE services 802 are used to develop and deploy industrial applications to a plant environment. In this example, the industrial environment includes one or more industrial controllers 118, HMI terminals 114, motor drives 710, servers 801 running higher level applications (e.g., ERP, MES, etc.), and other such industrial assets. These industrial assets are connected to a plant network 116 (e.g., a common industrial protocol network, an Ethernet/IP network, etc.) that facilitates data exchange between industrial devices on the plant floor. Plant network 116 may be a wired or a wireless network. In the illustrated example, the high-level servers 810 reside on a separate office network 108 that is connected to the plant network 116 (e.g., through a router 808 or other network infrastructure device).

In this example, IDE system 202 resides on a cloud platform 806 and executes as a set of cloud-based IDE service 802 that are accessible to authorized remote client devices 504. Cloud platform 806 can be any infrastructure that allows shared computing services (such as IDE services 802) to be accessed and utilized by cloud-capable devices. Cloud platform 806 can be a public cloud accessible via the Internet by devices 504 having Internet connectivity and appropriate authorizations to utilize the IDE services 802. In some scenarios, cloud platform 806 can be provided by a cloud provider as a platform-as-a-service (PaaS), and the IDE services 802 can reside and execute on the cloud platform 806 as a cloud-based service. In some such configurations, access to the cloud platform 806 and associated IDE services 802 can be provided to customers as a subscription service by an owner of the IDE services 802. Alternatively, cloud platform 806 can be a private cloud operated internally by the industrial enterprise (the owner of the plant facility). An example private cloud platform can comprise a set of servers hosting the IDE services 802 and residing on a corporate network protected by a firewall.

Cloud-based implementations of IDE system 202 can facilitate collaborative development by multiple remote developers who are authorized to access the IDE services 802. When a system project 302 is ready for deployment, the project 302 can be commissioned to the plant facility via a secure connection between the office network 108 or the plant network 116 and the cloud platform 806. As discussed above, the industrial IDE services 802 can translate system project 302 to one or more appropriate executable files—control program files 702, visualization applications 704, device configuration files 708, system configuration files 812—and deploy these files to the appropriate devices in the plant facility to facilitate implementation of the automation project.

Figure 9:
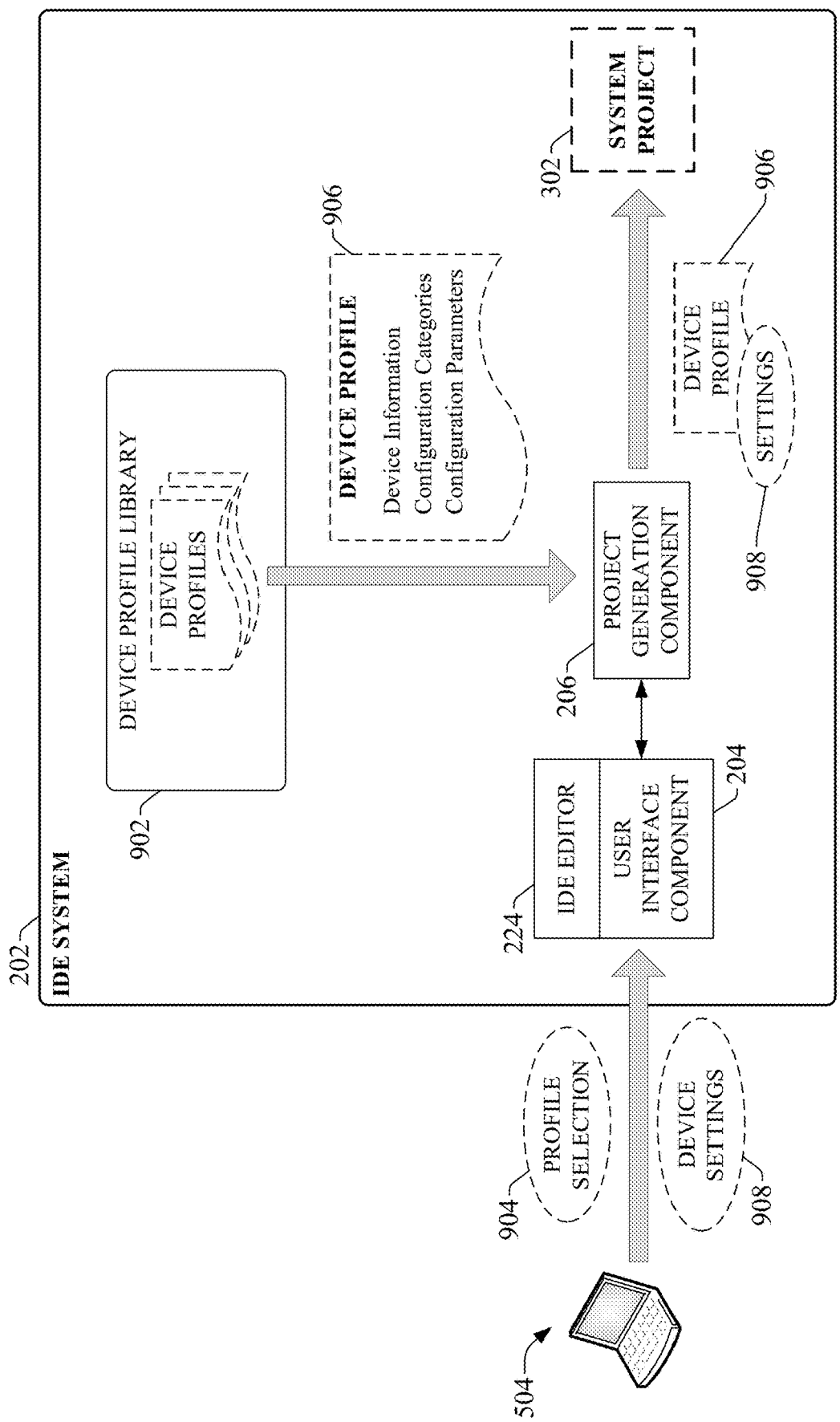
FIG. 9 is a diagram illustrating selection of device profiles from a profile library for inclusion in a system project.

Some embodiments of the industrial IDE system 202 can support the use of device profiles to facilitate setting values of configurable device parameters for devices that are to be included in the automation project. FIG. 9 is a diagram illustrating configuration of device parameters using device profiles 906. In general, each device profile 906 corresponds to a device type, and is a re-usable object or file that defines a set of configurable device parameters—e.g., network or communication settings, scale factors, input or output signal types, operating mode settings, tuning parameter values, maximum or minimum values, refresh rates, channel configurations, etc.—for its corresponding device type. Each device profile 906 can organize these device configuration parameters into categories to assist the user in locating a desired parameter. The device profile 906 can also record general information about the device, some of which can be modified by the user to customize a generic device type to reflect a specific device (an instance of the device type).

The IDE system 202 can store device profiles 906 for multiple types of devices in a device profile library 902 for selective inclusion in system projects 302. Device profiles 906 can be defined for a variety of different industrial devices or systems, including but not limited to industrial controller modules (e.g., analog or digital input and output modules, networking or scanner modules, special function modules, etc.), variable frequency drives, telemetry devices, safety relays, vision systems, or other such devices.

As illustrated in FIG. 9, during development of a system project 302, a user can interact with the IDE system's development interface to select a device profile 906 to be added to the project 302. The selected profile 906 typically corresponds to a type of device that will be included in the automation system for which the project 302 is being developed. Once a selected device profile 906 has been added to the system project 302 (via submission of profile selection input 904), the user can invoke device configuration interfaces defined by the device profile 906 and interact with these configuration interfaces to set values of device parameters or settings 908 for the device represented by the profile 906. When the system project 302 is subsequently deployed to the industrial controller 118 or other devices that make up the automation system (as illustrated in FIGS. 7 and 8), the device configuration settings 908 that had been submitted by the user are written to corresponding registers of the relevant field devices (e.g., the industrial controller 118 in the case of I/O modules or smart devices connected to the controller 118, or other target devices that are subject to the device settings).

Figure 10:
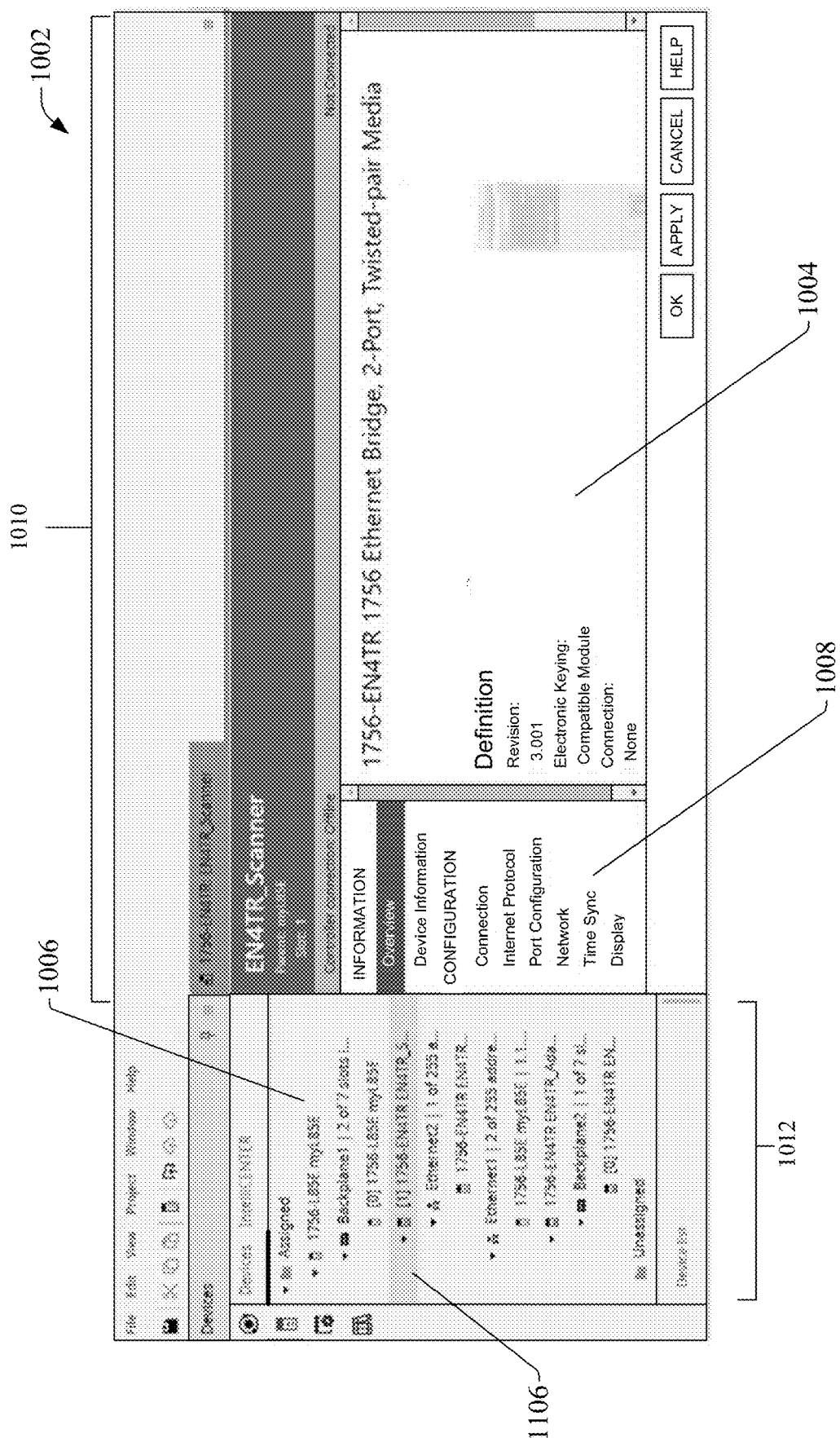
FIG. 10 is an example device profile interface that can be rendered on a client device by an industrial IDE.

FIG. 10 is an example development interface 1002 that can be rendered on a client device by the industrial IDE system's user interface component 204. Development interface 1002 is organized into panels and workspaces for navigating and editing the system project 302. The example interface 1002 depicted in FIG. 10 comprises a main workspace area 1010 that serves as the IDE system's primary work area and an explorer panel 1012 located adjacent to the main workspace area 1010. The explorer panel 1012 displays a navigation tree 1006 comprising a hierarchical arrangement of selectable nodes representing elements of the system project 302 being developed. In general, selection of a project element from the navigation tree 1006 causes the main workspace area 1010 to render project content corresponding to the selected element, such as ladder logic or other types of control code, program routines, controller tag definitions, device configuration information, or other aspects of the project 302. The user can interact with these project elements within the main workspace area 1010 to perform such development functions as writing or editing controller code (e.g., ladder logic, function block diagrams, structured text, etc.), configuring device parameter settings, defining controller tags, or other such project development functions.

Figure 11:
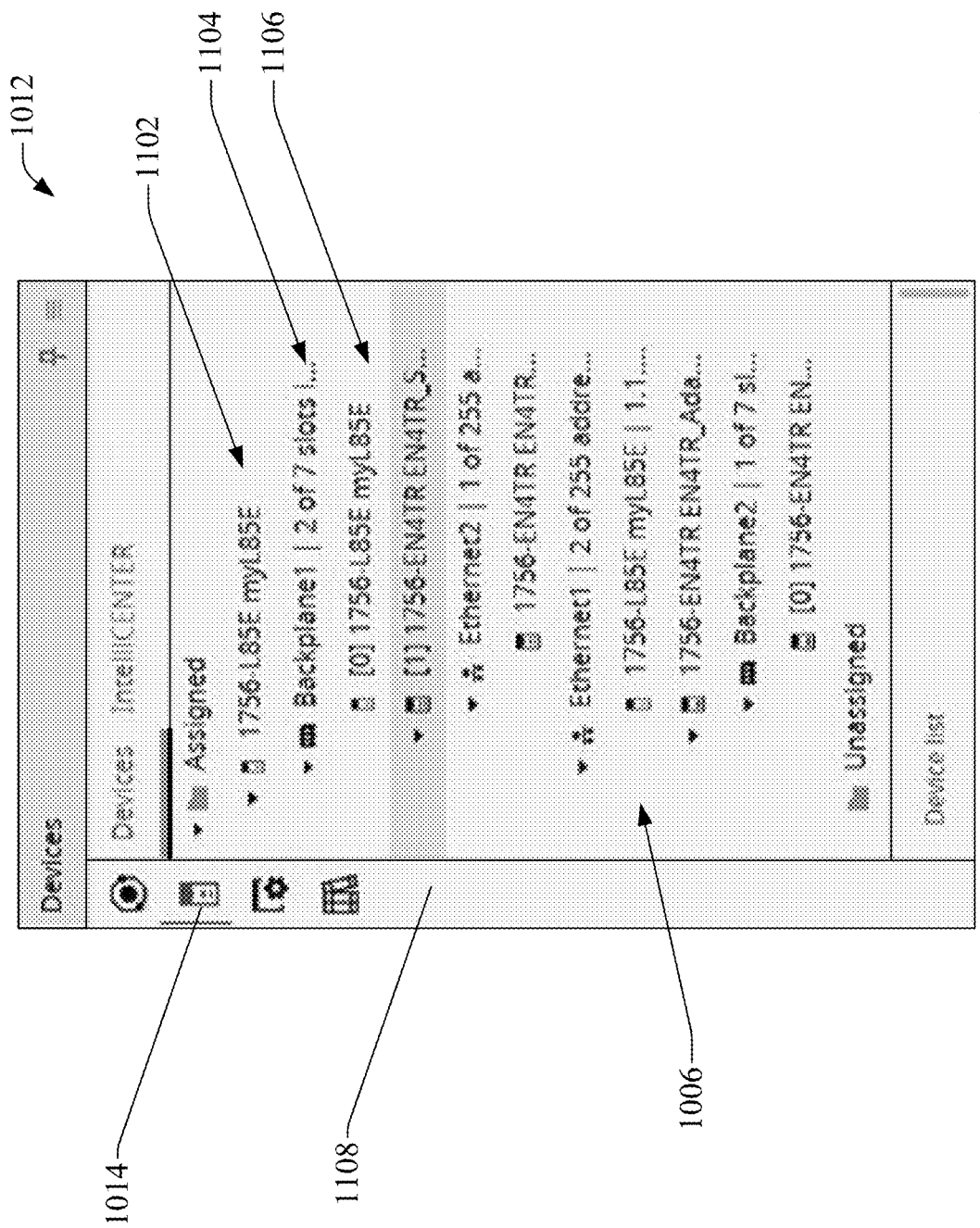
FIG. 11 is a view of a device profile interface explorer panel and its associated navigation tree.

FIG. 11 is a view of the explorer panel 1012 and its associated navigation tree 1006 in isolation. As noted above, explorer panel 1012 serves as a means for navigating and viewing content of a system project 302 and supports various ways for performing this navigation. Selectable viewing categories are rendered as selectable explorer icons in a control bar 1108 pinned to the left-side edge of the explorer panel 1012. Selection of an explorer icon from the control bar 1108 sets the type of project content to be browsed via the Explorer panel 1012. In the scenario depicted in FIG. 11, a Devices view icon 1014 has been selected in the control bar 1108, causing the explorer panel 1012 to display, as the navigation tree 1006, a hierarchical arrangement of device nodes 1106 representing the devices defined for the system project 302.

For an example system project 302, the device navigation tree 1006 can include a controller node 1102 representing an industrial controller 118 to be programmed as part of the system project 302. A backplane node 1104 is defined as a child node of the controller node 1102 and represents the backplane of the industrial controller 118 on which one or more devices or modules will be installed. Any modules or devices to be connected to the controller's backplane are represented as device nodes 1106 below the backplane node 1104. Example devices that can be associated with the controller can include, but are not limited to, digital or analog input modules, digital or analog output modules, networking or scanning modules, analytic modules, special function modules, smart industrial devices, motor drives such as variable frequency drives, or other such devices. Per the workflow illustrated in FIG. 9, a user can add a new device to the project by adding a new device node 1106—representing a device profile 906 for the type of the device—to the device navigation tree 1006. Any suitable interaction can be used to add a new device to the navigation tree 1006. For example, the user may select the backplane node 1104 and invoke a device profile selection window (e.g., by right-clicking on the backplane node 1104) that displays a list of available types of devices that can be added to the project 302. Each device type has a corresponding device profile 906 stored in the system's device profile library 902. The device profile 906 defines information about the corresponding device type, as well as any device parameters associated with the device type whose values can be set by the user.

The explorer icons rendered on the control bar 1108 can also include an Application icon that causes the explorer panel 1012 to display a list of applications—e.g., industrial control programs such as ladder logic routines—that make up the system project 302. This viewing mode allows the user to develop, view, and edit control programs within the main workspace area 1010. These control programs will be installed and executed on the industrial controller 118.

Returning to FIG. 10, selecting a device node 1106 in the navigation tree 1006 causes the main workspace area 1010 to display an interactive device configuration interface for viewing and editing configuration parameters for the selected device. Device information and configurable device parameters displayed on this device configuration interface are defined by the device profile 906 for the selected device. In the example depicted in FIG. 10, the device configuration interface comprises a main configuration area 1004 and a category window 1008 that lists various informational and configuration categories for the device. Selecting a category from this window 1008 causes the main device configuration area 1004 to render information or configurable device parameters relating to the selected category.

Informational categories listed in the category window 1008 can include an Overview category and a more detailed Device Information category. Selection of the Overview category can cause summary information about the device—e.g., model number and revision number of the device, device type, a type of electronic keying, or other such information—to be rendered in the main workspace area 1010. In the example depicted in FIG. 10, the user has selected a device node 1106 representing an ethernet bridge module that will be installed on the controller's backplane, and has selected the Overview category within the category window 1008 so that general overview information for the module can be viewed.

Figure 12:
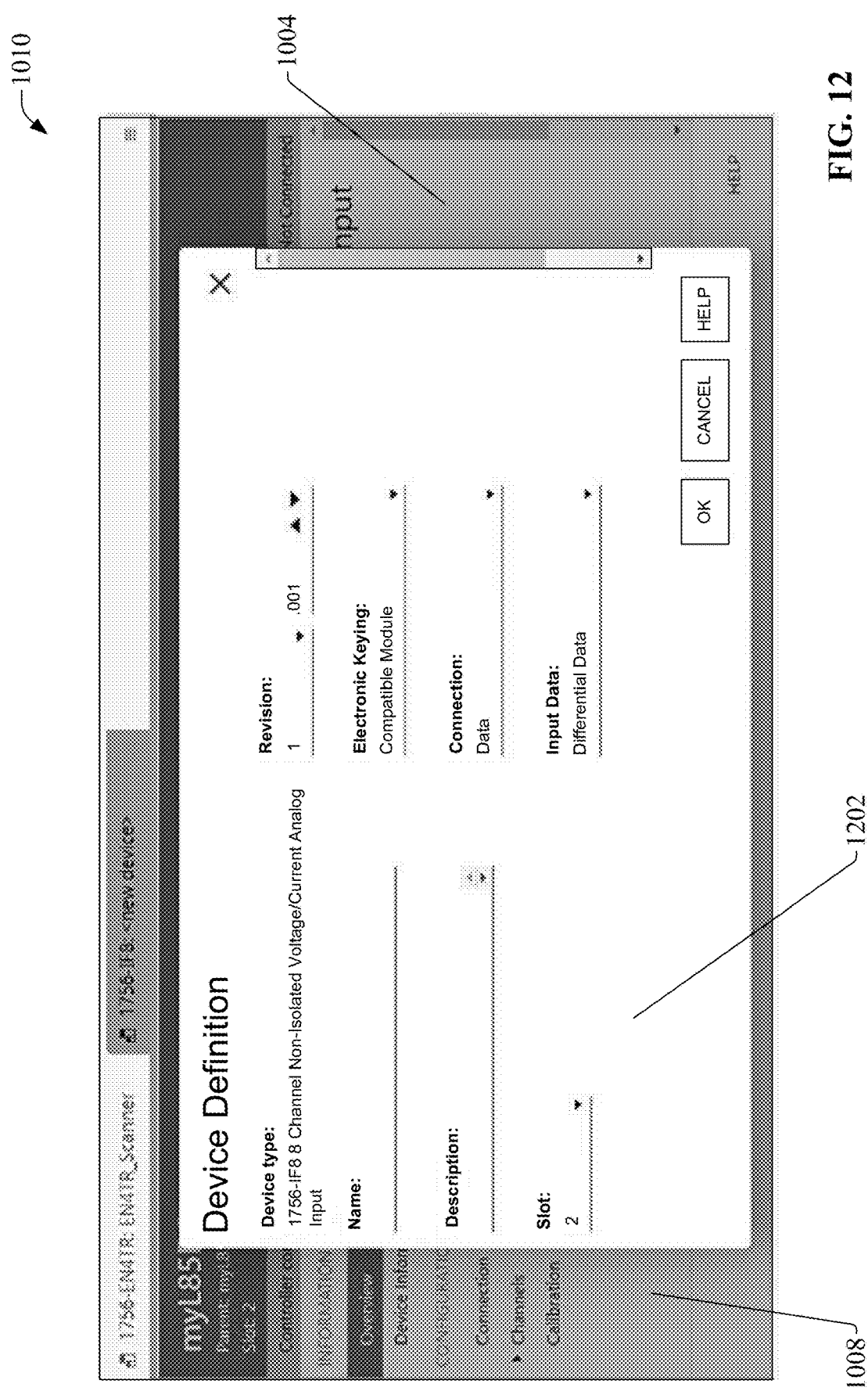
FIG. 12 is a view of the main workspace area of a device profile interface in which a Device Definition editing window has been invoked for the selected device.

Depending on the type of device, some of the device information accessible via the Overview or Device Information categories can be edited by the user. FIG. 12 is a view of the main workspace area 1010 in which a Device Definition editing window 1202 has been invoked for the selected device. This window 1202 includes data fields that allow the user to enter or edit various items of information about the device, including but not limited to a name of the device, a description of the device, a controller slot number in which the device is to be installed (if the device is a module to be installed on a controller backplane), revision information, a type of electronic keying, a type of connection, a type of input data, or other such information.

Figure 13A:
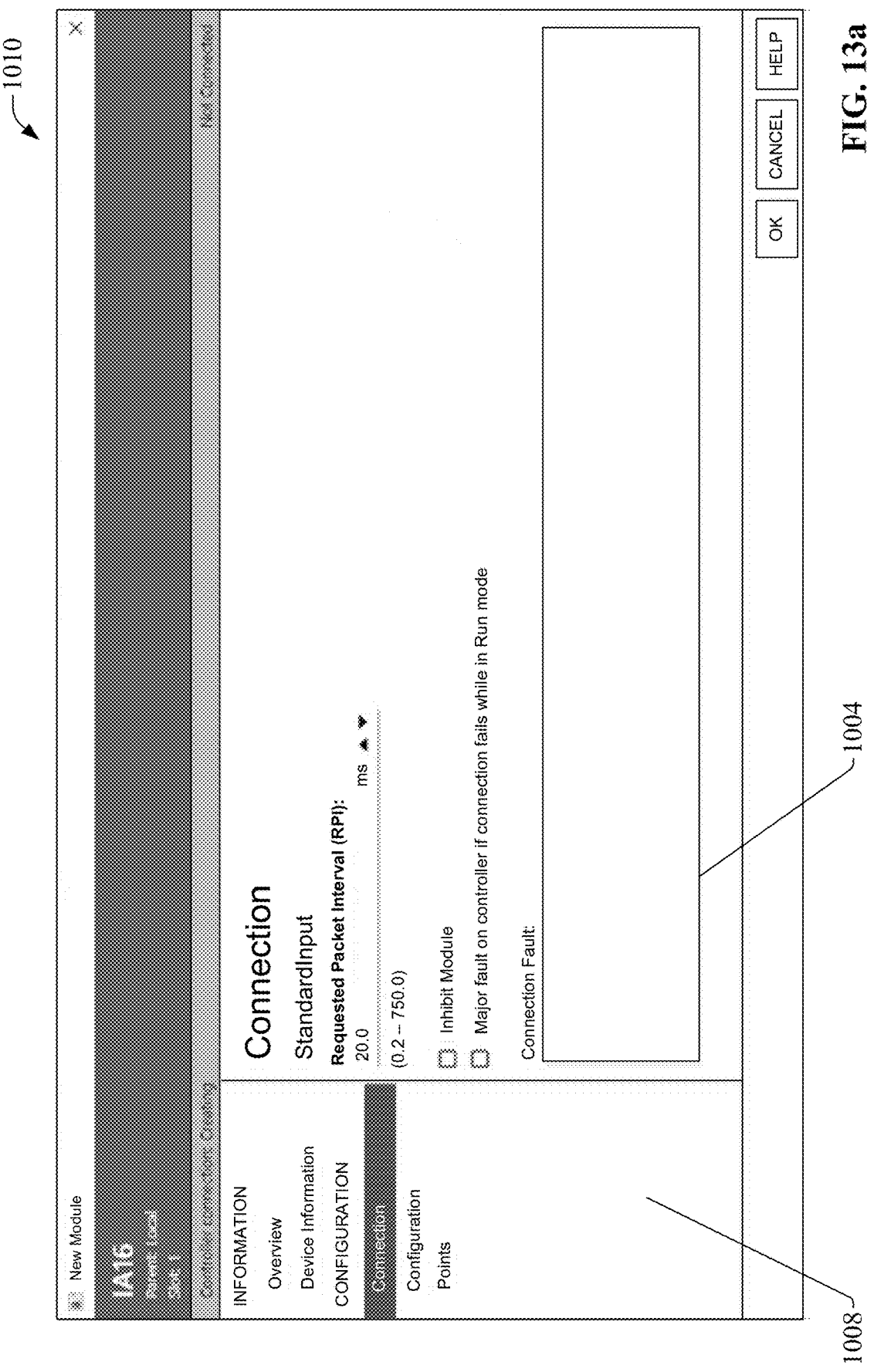
FIG. 13*a* is a view of a main workspace area of a device profile interface in which the user has selected a 16-point digital input module.

Returning again to FIG. 10, configuration categories listed in the category window 1008 can include, for example, a Connection category, an Internet Protocol category, a Port Configuration category, a Network category, a Time Sync category, a Display category, a Channels category, a Calibration category, an I/O points category, or other such configuration categories. The available configuration categories, as well as the specific parameters that are accessible under each category, can depend on the type of device being viewed. For example, FIG. 13*a* is a view of the main workspace area 1010 in which the user has selected a 16-point digital input module. Available configuration categories listed in the Category window 1008 for this type of device include a Connection category, a Configuration category, and a Points category. The Connection category has been selected in FIG. 13, causing the configuration area 1004 to display configurable connection parameters for the module. These parameters include a packet interval timing, an indication as to whether the module is to be inhibited, and an indication as to whether a connection failure is to trigger a major fault on the controller 118. The configuration area renders interactive graphical controls—e.g., data entry boxes, drop down selection windows, binary check boxes, etc.—for each configurable parameter to allow the user to enter values of these parameters.

Figure 13B:
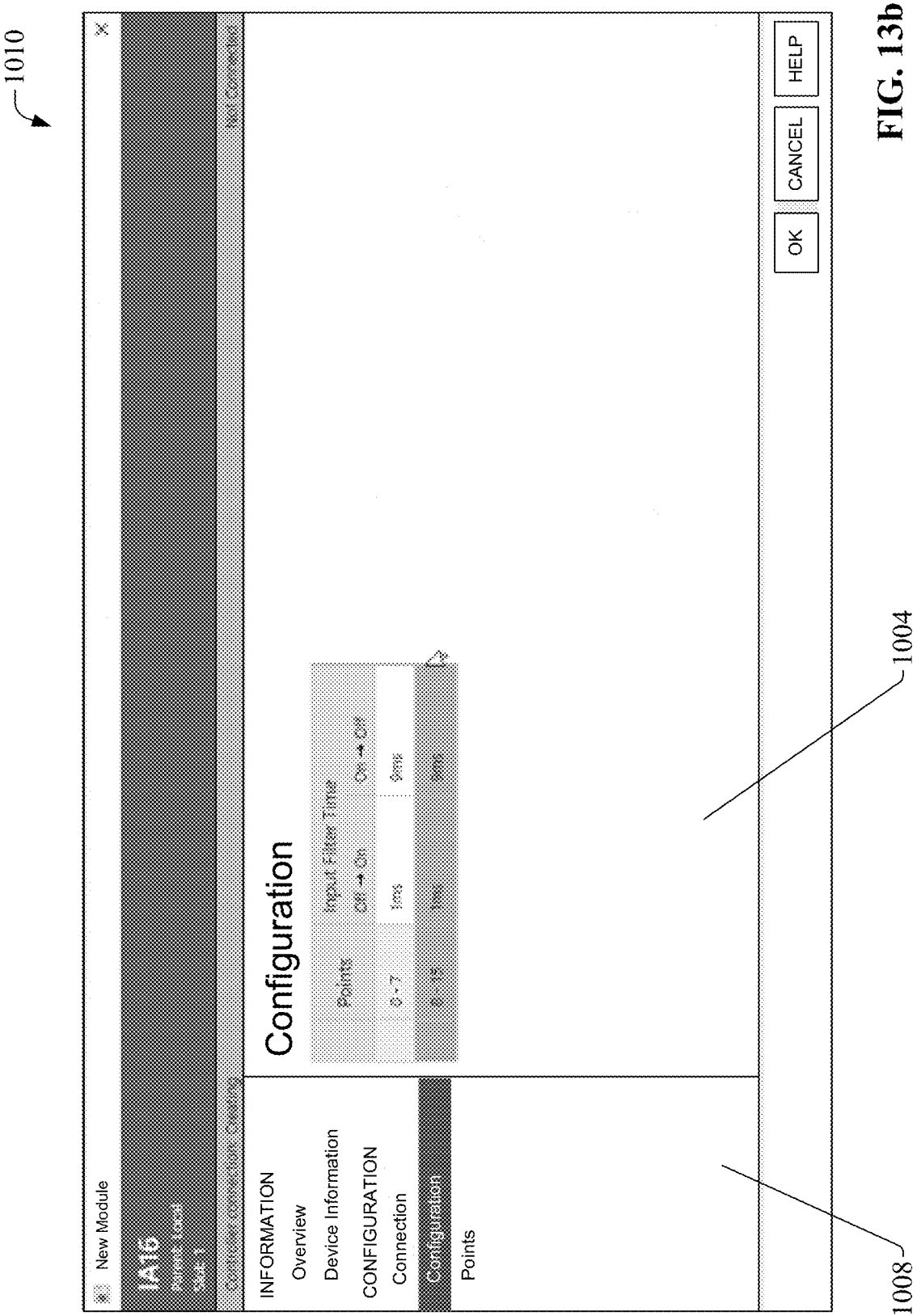
FIG. 13*b* is a view of the main workspace area of a device profile interface in which the Configuration category has been selected in the Category window.
Figure 13C:
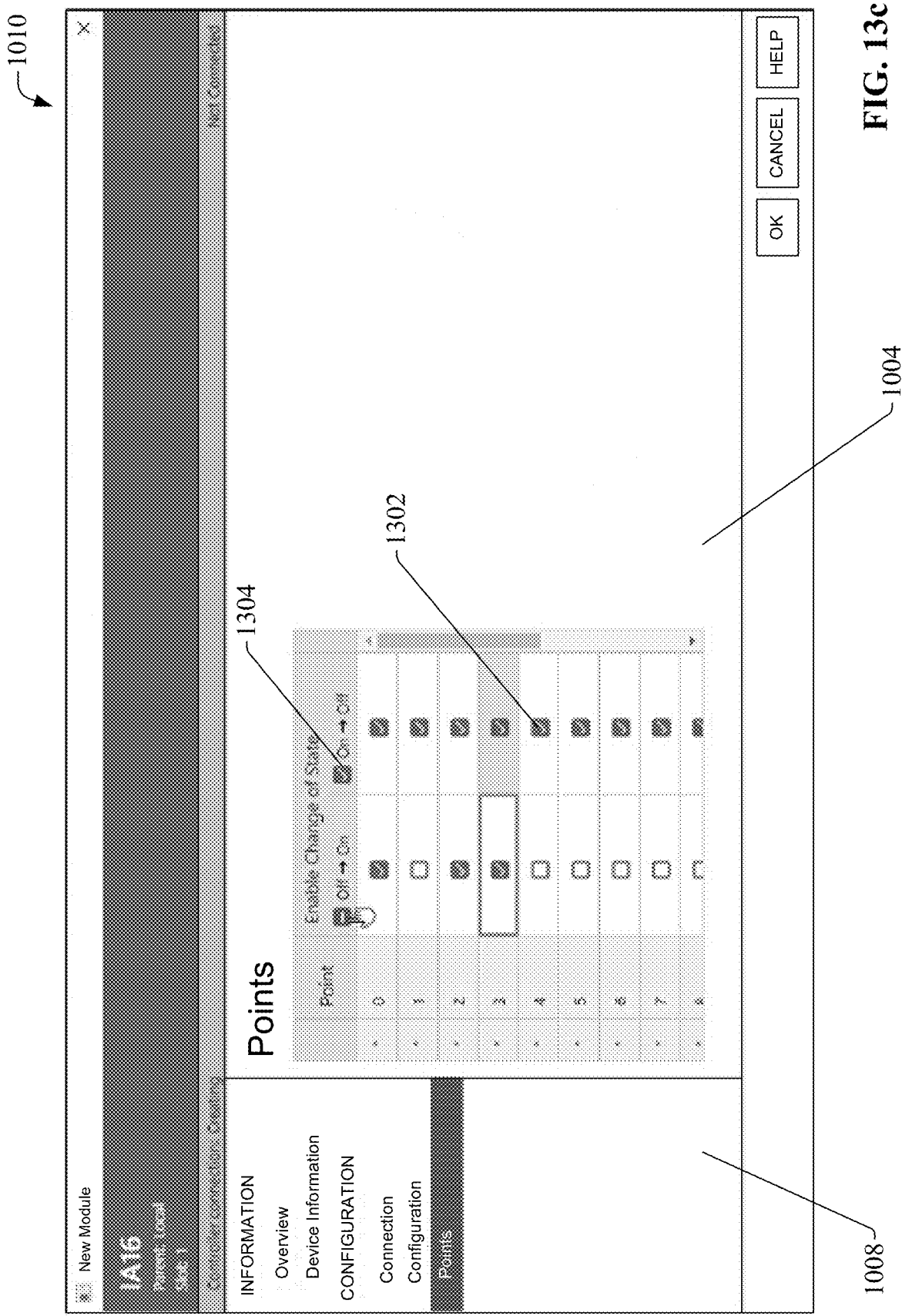
FIG. 13*c* is a view of the main workspace area of a device profile interface in which the Points category has been selected in the Category window.

FIG. 13*b* is a view of the main workspace area 1010 in which the Configuration category has been selected in the Category window 1008. For the selected analog input module, selecting this category causes the configuration area 1004 to display an interactive table that allows the user to set input filter times for groups of input points. FIG. 13*c* is a view of the main workspace area 1010 in which the Points category has been selected in the Category window 1008. This invokes another interactive table in the configuration area 1004 that allows the user to selectively enable or disable changes of state—both on-to-off and off-to-on transitions—for each input point of the module. In contrast to generic table-based interfaces, this graphical configuration interface comprises both individual checkbox controls 1302 that allow the user to enable or disable state changes for individual input points, as well as global checkbox controls 1304 that allow the user to enable or disable state changes for all of the module's input points with a single selection input.

Figure 14A:
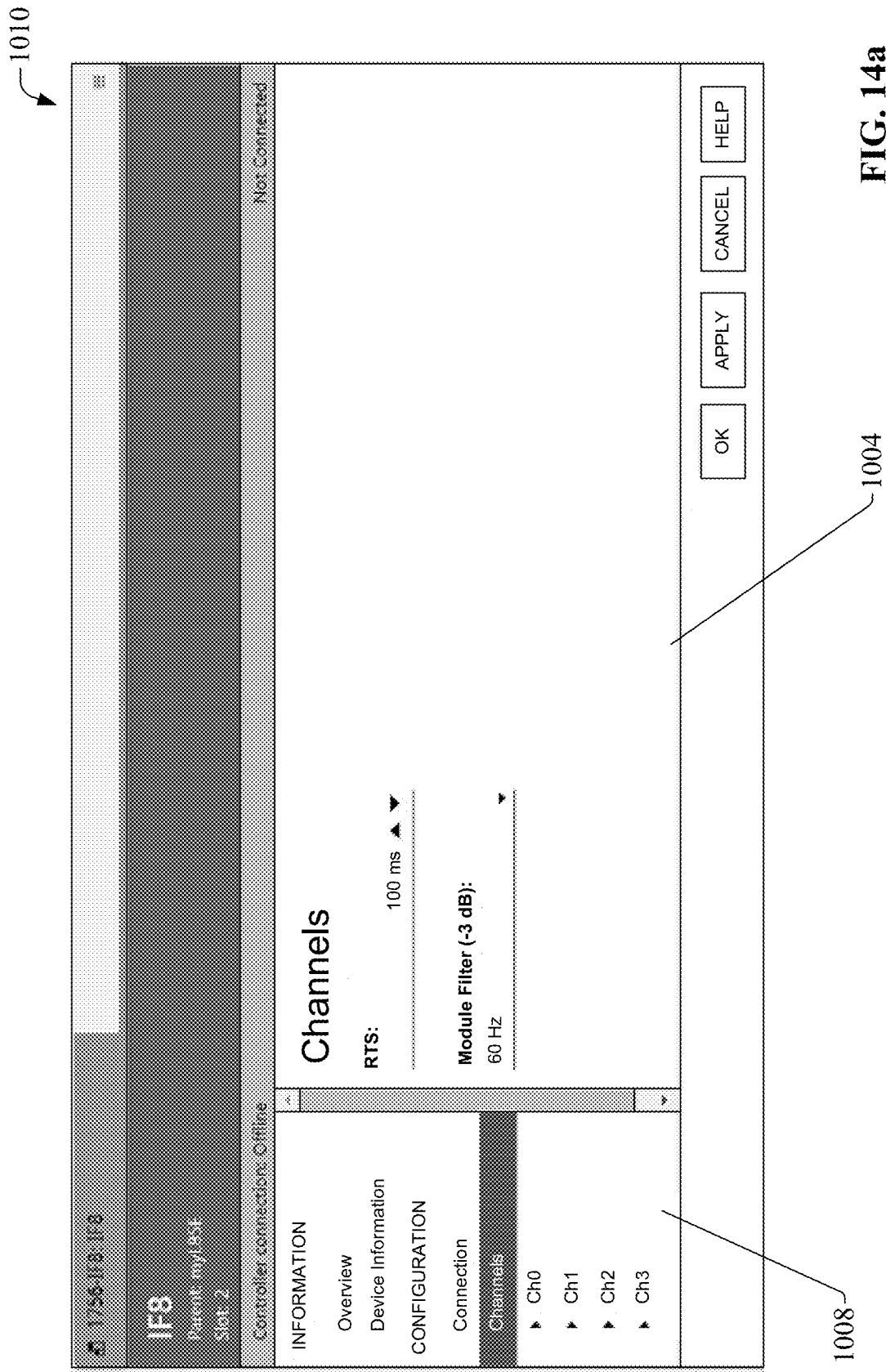
FIG. 14*a* is a view of the main workspace area of a device profile interface in which an 8-channel analog input module has been selected.
Figure 14B:
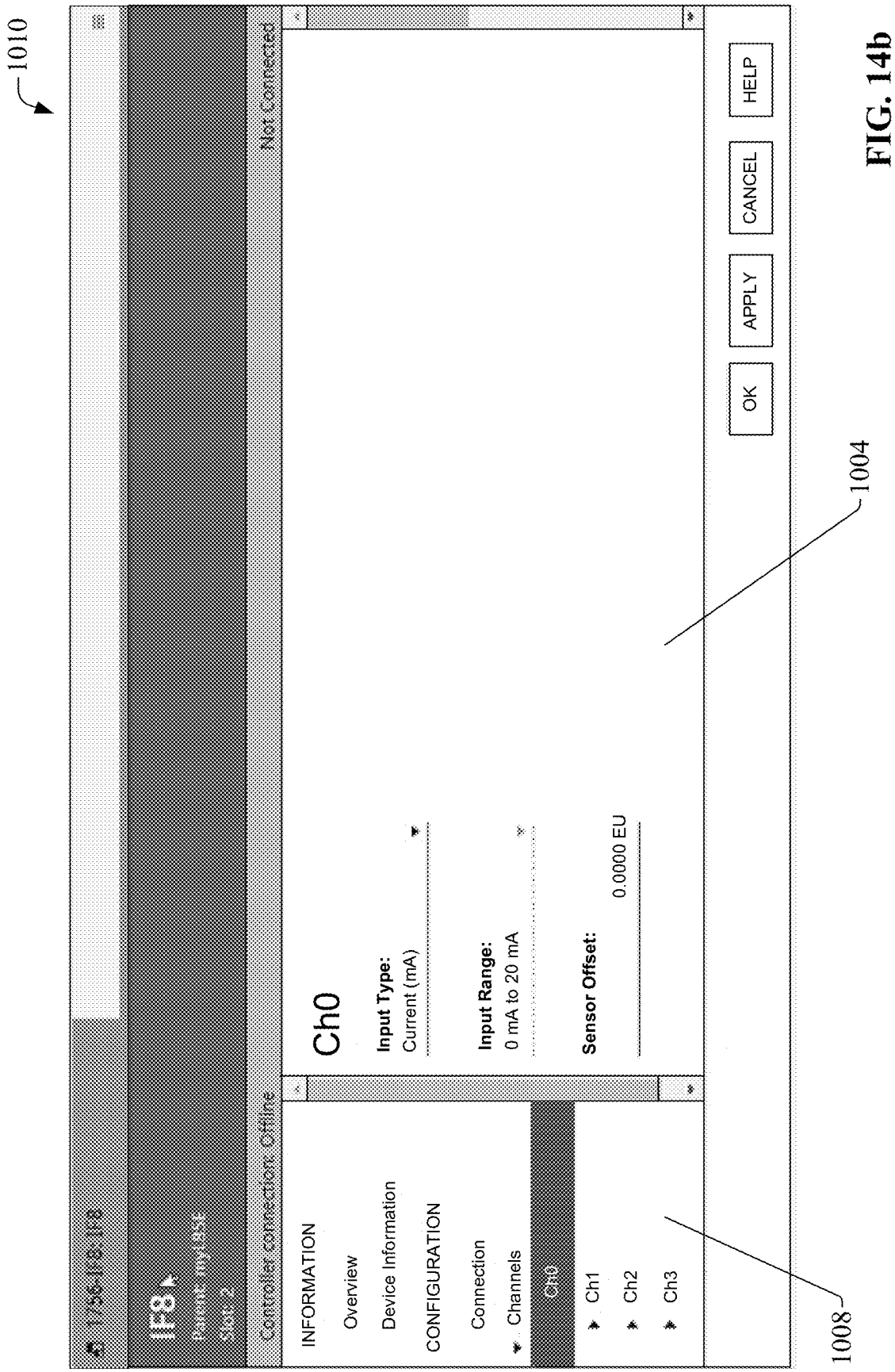
FIG. 14*b* is a view of the main workspace area of a device profile interface in which a user has selected to set configuration parameters for individual channels of an input module.
Figure 14C:
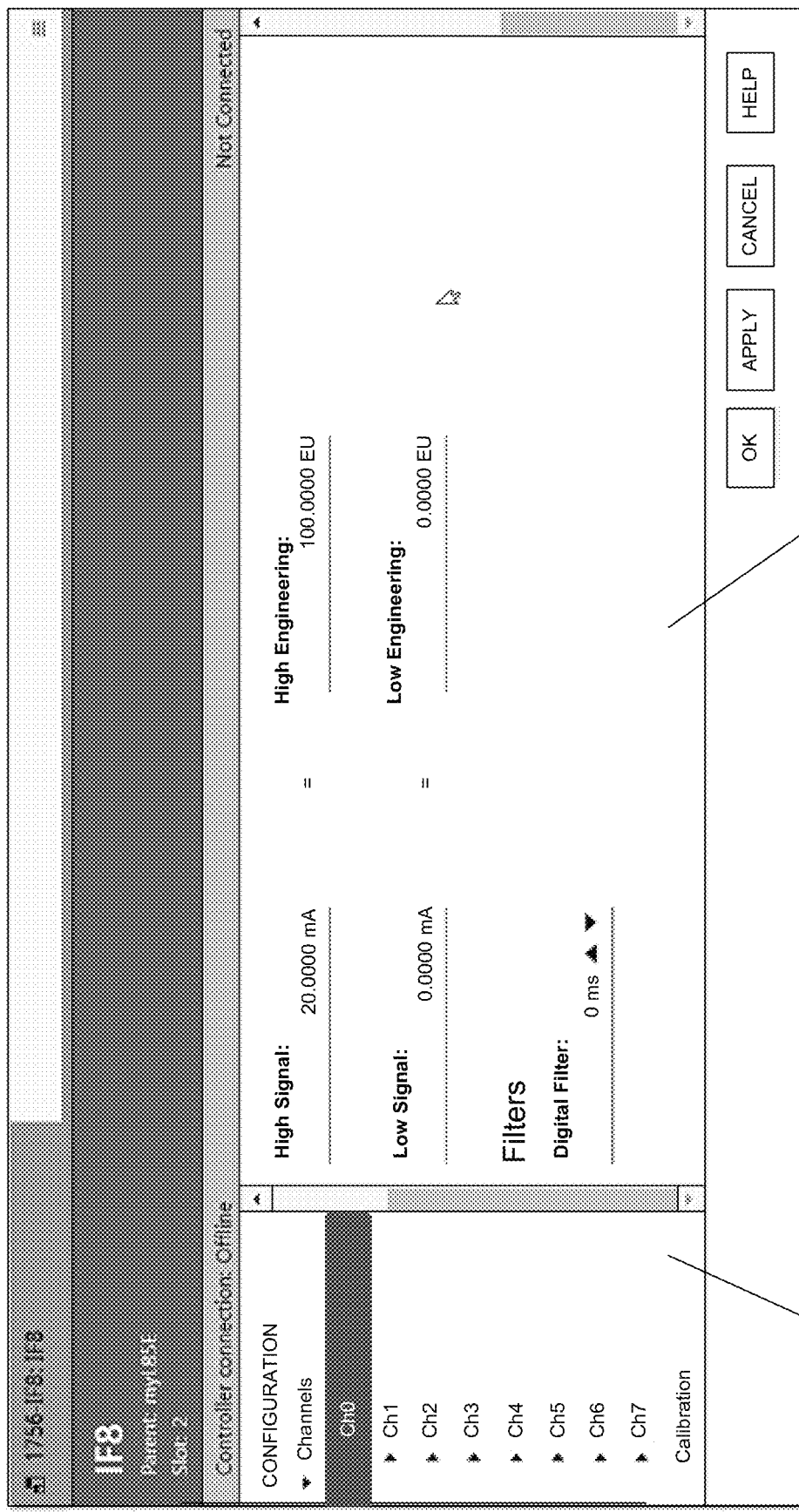
FIG. 14*c* is another view of the main workspace area of a device profile interface in which a user has selected to set configuration parameters for individual channels of an input module.

As noted above, the device profile 906 for the device being configured defines the configuration parameters that will be presented for viewing and editing in the main workspace area. FIG. 14*a* is a view of the main workspace area 1010 in which another type of device—an 8-channel analog input module—has been selected. In this scenario, the configuration categories listed in the Category window 1008 include a Channels category for configuring the analog input channels of the module. General channel parameters that are applicable to all channels—including the real time sampling (RTS) period and the module filter frequency—are rendered in the configuration area 1004 and can be edited by the user. In addition, configuration parameters for each individual channel can be set within the configuration area 1004, as shown in FIGS. 14*b* and 14*c*. These channel-specific parameters can include, but are not limited to, a type of input signal provided to the channel (e.g., current or voltage), a range of the input signal (e.g., 4-20 milliamp, 0-10 volts, etc.), an offset value for the channel, high and low input signal limits, digital filter value, or other such configuration settings.

In some embodiments, the IDS system 202 can be configured to generate dynamic feedback in response to determining that the user has submitted a device configuration parameter value that is not within a valid range for the edited parameter. In this regard, some device profiles 906 can define ranges of valid values for respective device parameters. As the user submits device configuration parameter values, the project generation component 206 can verify that each parameter value submitted by the user is within the valid ranges. If the user enters a parameter value that is outside that parameter's valid range, the user interface component 204 can render a notification on the development interface 1002 indicating that the value entered by the user is invalid. The project generation component 206 can reject any submitted parameter values that are outside their valid ranges.

The device configuration interfaces illustrated in FIGS. 10-14*c* and described above provide an intuitive interface for configuring industrial devices used in the system project 302. The device profile library 902 can store device profiles 906 for devices offered by multiple different device vendors, and the IDE system's interface allows these devices to be configured using a common device configuration workflow regardless of device vendor. The graphical device configuration interfaces generated by the IDE system 202 offer a more intuitive configuration workflow relative to more generic table-based device configuration interfaces. In some embodiments, the IDE system 202 can generate the device configuration interfaces using a web-based format, such as hypertext markup language (HTML), allowing the interfaces to be executed on a cloud platform or internet server and served to any type of device that supports web browsing. This format also allows the resulting device configuration interfaces to support a greater degree of customization relative to simple text-based device configuration profiles.

In some design scenarios, a developer may wish to apply the same device configuration edits to multiple devices of the same or similar device type. If there are many such devices requiring the same set of device parameter edits, re-entering the device parameter modifications for each device can be laborious and time-consuming, even if only a small number of device parameters are to be modified relative to their default values.

As an alternative to this manual approach, the full set of device parameter values for a device can be saved as a configuration file (e.g., a binary or text file), which can then be applied to other devices. However, this approach requires all of the device's configuration parameters to be saved in the configuration file, including those that have not been modified by the user from their default settings. These files must also be created and recorded for each device defined in a project 302. Also, if a set of device parameters are to be replicated across multiple devices having device profiles interfaces of varying formats, it is necessary store versions of the device parameter file that accord to these various formats.

To address these and other issues, one or more embodiments of the IDE system 202 can include a device configuration component 210 that stores a custom edit to a device's configuration parameters as a record of the user's sequential interactions with the device profile's graphical interfaces. These recoded interactions can then be reproduced on configuration interfaces of other device profiles for other devices.

Figure 15:
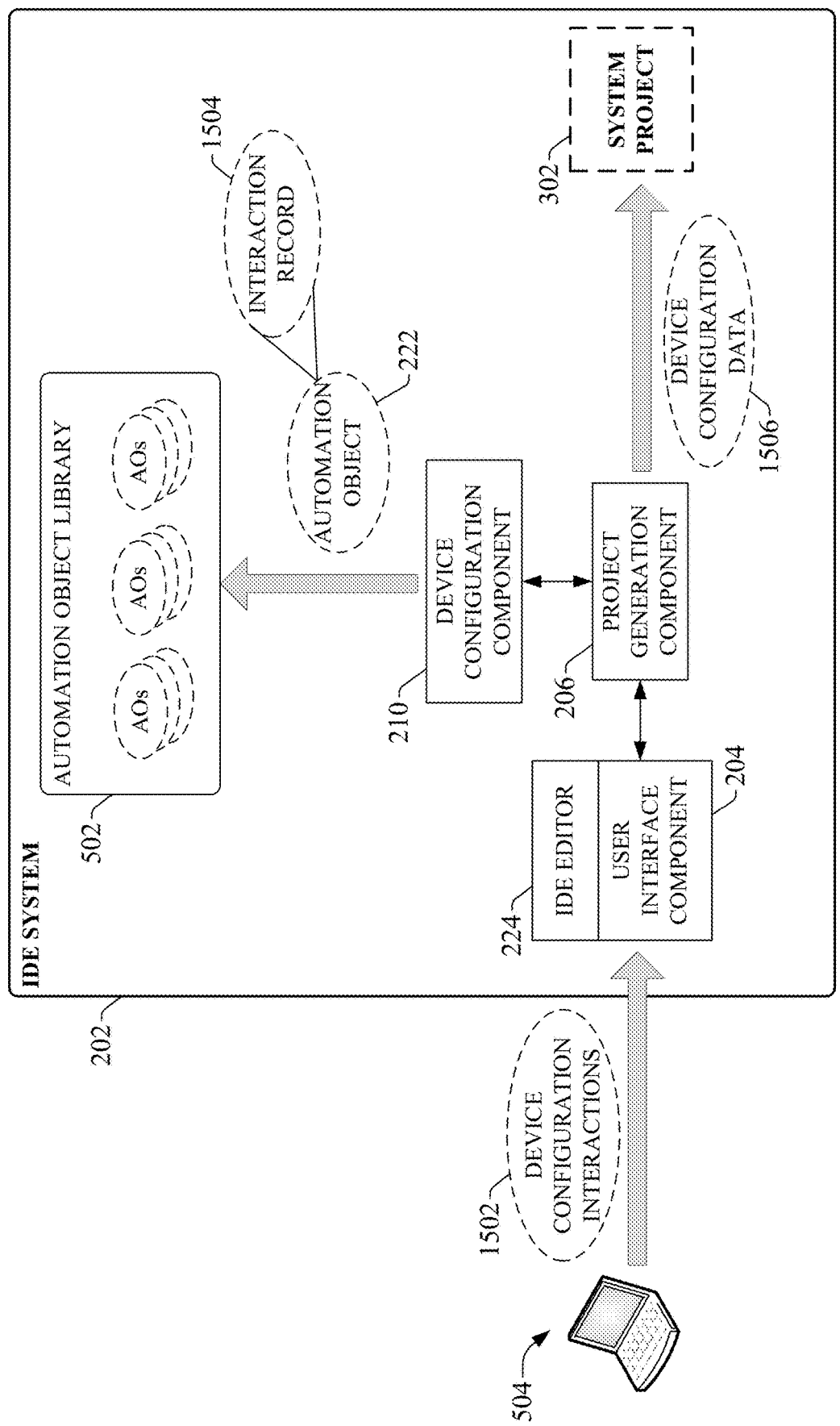
FIG. 15 is a diagram illustrating monitoring and storage of a user's device configuration interactions as an interaction record for subsequent playback.

FIG. 15 is a diagram illustrating monitoring and storage of a user's device configuration interactions 1502 as an interaction record 1504 for subsequent playback. In this example scenario, a user interacts with a device profile configuration interface (such as those illustrated in FIGS. 12-14c) to edit one or more device parameter values for an industrial device defined in the system project 302. These edits are submitted by the user as a sequence of device configuration interactions 1502, such as cursor movements, mouse clicks, and keystrokes used to navigate views of the device configuration interfaces, to select device parameter controls (e.g., checkboxes, data entry fields, drop-down selection boxes, buttons, etc.), and to enter values for selected device parameters. As described above in connection with FIGS. 9-14c, the project generation component 206 updates the system project 302 to record the edited device configuration data 1506 based on the user's device configuration interactions 1502.

As the user submits these device configuration edits, the device configuration component 210 monitors and records the user's device configuration interactions 1502 as an interaction record 1504. In an example embodiment, this interaction record 1504 can comprise executable code that, when executed, reproduces the user's device configuration interactions 1502 in the order in which the interactions 1502 were submitted by the user. In an example device configuration scenario, the user may invoke a device profile and modify a single device parameter value for the corresponding device. To perform this edit, the device configuration interactions 1502 may include moving the cursor to the Category window 1008 of the device profile's configuration interface, selecting a category in this window 1008 to invoke the desired interface in the configuration area 1004, moving the cursor to the control in the configuration area 1004 corresponding to the parameter to be edited, selecting the control, and entering the modified value in the control (e.g., by entering a numeric value or by selecting the value from a drop-down selection box).

This sequence of device configuration interactions 1502 is recorded by the device configuration component 210 as an interaction record 1504 representing the edit. Cursor movements may be recorded as coordinates corresponding to the cursor's target location on the device configuration interface just prior to a next step of the sequence (e.g., the cursor's target location at the moment the mouse is clicked to select a control at that target location). Control or object selections can be recorded as mouse click (or double mouse click) actions at the cursor location. Alphanumeric inputs can be recorded as the series of keystrokes entered by the user (which may include backspaces, deletions, arrow inputs, and entered text or numerical values). The device configuration component 210 can also record any click-and-drag actions performed by the user (e.g., to highlight a string of text or values on the device profile interface).

The device configuration component 210 can record all such device configuration interactions 1502 for a given device configuration session, where a device configuration session begins when a user invokes a selected device profile (to begin the session of editing the corresponding device's configuration parameters) and ends when the user closes the device profile's configuration interface, submits or applies the configuration edits (e.g., by selecting an Apply control button), or otherwise indicates that configuration of the device is complete. The user can modify any number of device parameters during a configuration session for a given device, and the device configuration component 210 records all device configuration interactions 1502 submitted by the user during the configuration session.

The resulting interaction record 1504 can comprise any suitable file or object format capable of reproducing the device configuration interactions 1502 when executed. In some embodiments, the device configuration component 210 can store the interaction record 1504 as an automation object 222 representing the device configuration, or as a property of an automation object 222 representing the device itself. The automation object 222 and its associated interaction record 1504 can then be stored in the automation object library 502 as a reusable object that can be applied to other device instances within the system project 302. The interaction record 1504 can also be encapsulated and stored in other ways without departing from the scope of one or more embodiments.

Figure 16:
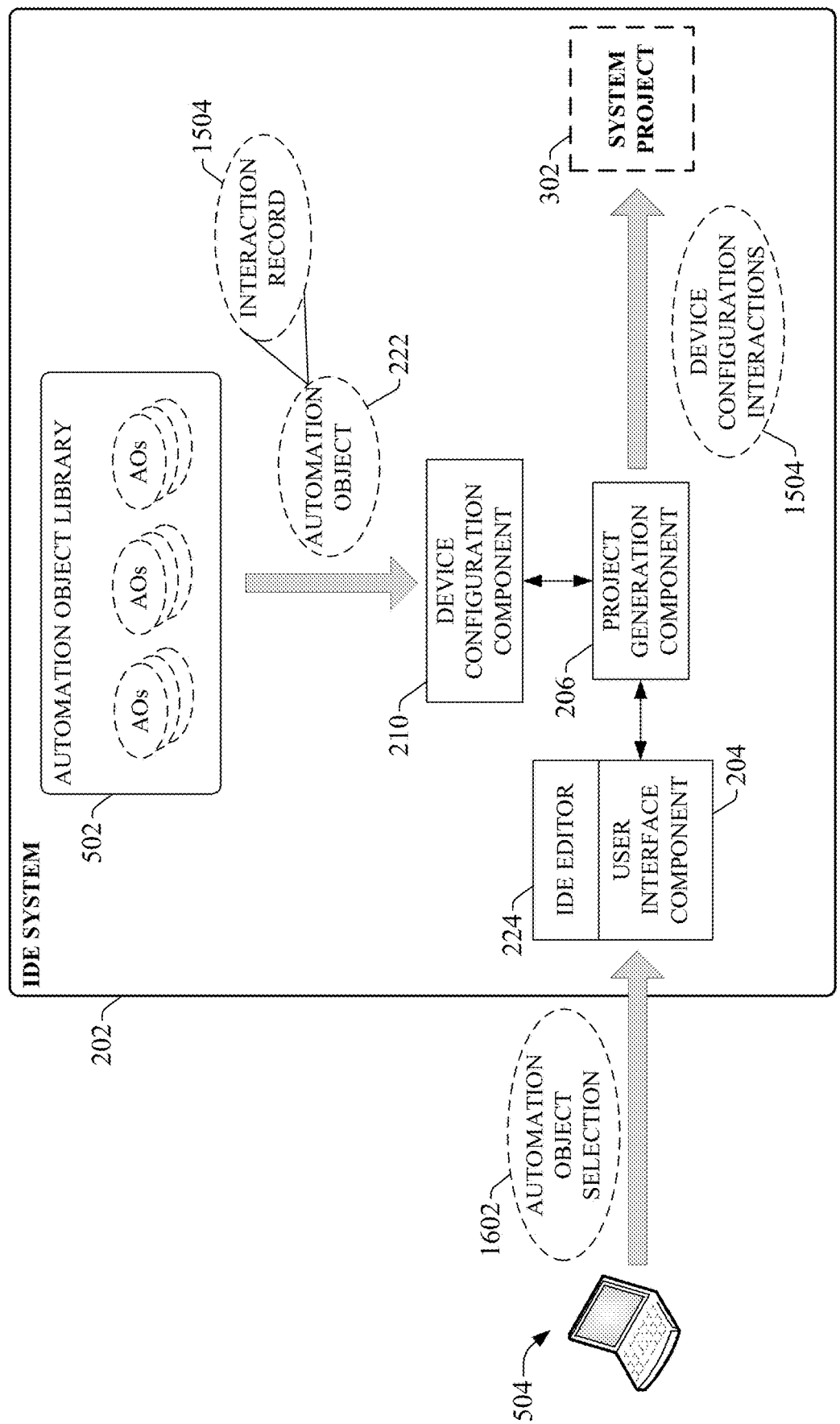
FIG. 16 is a diagram illustrating selective application of a stored interaction record to another device profile.

FIG. 16 is a diagram illustrating selective application of a stored interaction record 1504 to another device profile. Once an interaction record 1504 for a first device has been stored in the automation object library 502 (e.g., as an automation object 222 or a property of an automation object 222), the record 1504 becomes available for selective application to other device profiles within a system project 302. If the user wishes to apply the same device parameter edits that yielded the interaction record 1504 to a second device defined within the system project 302, the user can select the automation object 222 that defines the interaction record 1504 and apply the interaction record 1504 to the device profile 906 corresponding to the second device. This causes the interaction record 1504 to be executed against the device profile for the second device, such that the device configuration interactions 1502 recorded in the interaction record 1504 are reproduced on the configuration interfaces of the device profile for the second device. This causes the subset of device parameters corresponding to those that were selected and edited for the first device to be edited the same manner for the second device without requiring the user to manually re-enter the edits.

This approach for storing device configuration edits and applying the edits to other devices has advantages relative to storing modified text or binary files containing all of the device's configuration parameters. For one, the interaction record 1504 will typically have a smaller size relative to a text file containing all of the parameters—both edited and unedited—for a given device. Also, by applying only the configuration interactions 1502 that were used to modify a selected subset of device parameters, this approach ensures that other device parameters of the target device maintain their original values rather than being overwritten by another device's corresponding default parameter values. This approach also mitigates the need to maintain multiple different formats of a configuration file to accommodate device profiles having different formats. Even if the device configuration interfaces for a target device are formatted differently than those of the original device that gave rise to the interaction record 1504 (e.g., due to the fact that there may be device parameters that are not common to both devices), this approach can still accurately reproduce the original edits on the target device provided the parameters being edited are common to both devices and are accessible using the same sequence of interactions 1502.

Moreover, since the interaction record 1504 defines the device parameter edits in terms of a first user's interactions with graphical device profile interfaces, a second user can apply these interactions to another device even if the second user has no knowledge of where the device parameters to be edited are located within the graphical device profile interfaces. This approach also saves considerable development time and effort relative to manually entering the same parameter edit on multiple device profiles. In general, this approach to propagating device configuration edits to multiple devices leverages the graphical device configuration workflow made possible by the device profiles 906.

In some embodiments, the device configuration component 210 can also apply a security layer to interaction records 1504 so that the device configuration interactions 1502 are locked into an encrypted interaction record 1504. In such embodiments, the device configuration component 210 can permit selection and execution of the interaction record 1504 only if the user invoking the record 1504 has submitted suitable authentication credentials for the project editing session.

Also, some embodiments of the device configuration component 210 can support the use of artificial intelligence to generate the interaction record 1504 for a given device editing session or to execute the interaction record 1504 on another device profile 906. For example, if an interaction record 1504 that was generated based on device configuration interactions 1502 with a first graphical interface of a first device profile is subsequently applied to a second graphical interface of a second device profile, and an edited device parameter is positioned at a different location on the second graphical interface relative to its location on the first graphical interface, the device configuration component 210 can use artificial intelligence or machine learning to infer that the parameter on the second interface corresponds to the edited parameter of the first interface despite the different locations. Artificial intelligence can also be used in connection with generating the interaction record 1504 in some embodiments. For example, the device configuration component 210 can infer that a user's device configuration interactions 1502 include unnecessary steps—e.g., superfluous cursor movements, graphical element selections, or keystrokes—and eliminate these unnecessary steps from the interaction record 1504 so that only those interactions necessary to implement the device parameter modifications are recorded.

The industrial device configuration features described herein can allow an edit to one or more device parameters of a first device profile to be easily and quickly applied to other device profiles without the need to manually re-enter the edits and without requiring storage of a device configuration file that records all of the device's parameter values. Each reusable interaction record 1504 can be applied to a selected device profile to facilitate duplicating a set of edits on that profile without requiring the user to have knowledge of the locations of the device parameters being edited. The interaction records 1504 can be stored in an IDE system library as a selectable design object that can be applied as needed to device instances defined in an industrial system project 302.

Figure 17A:
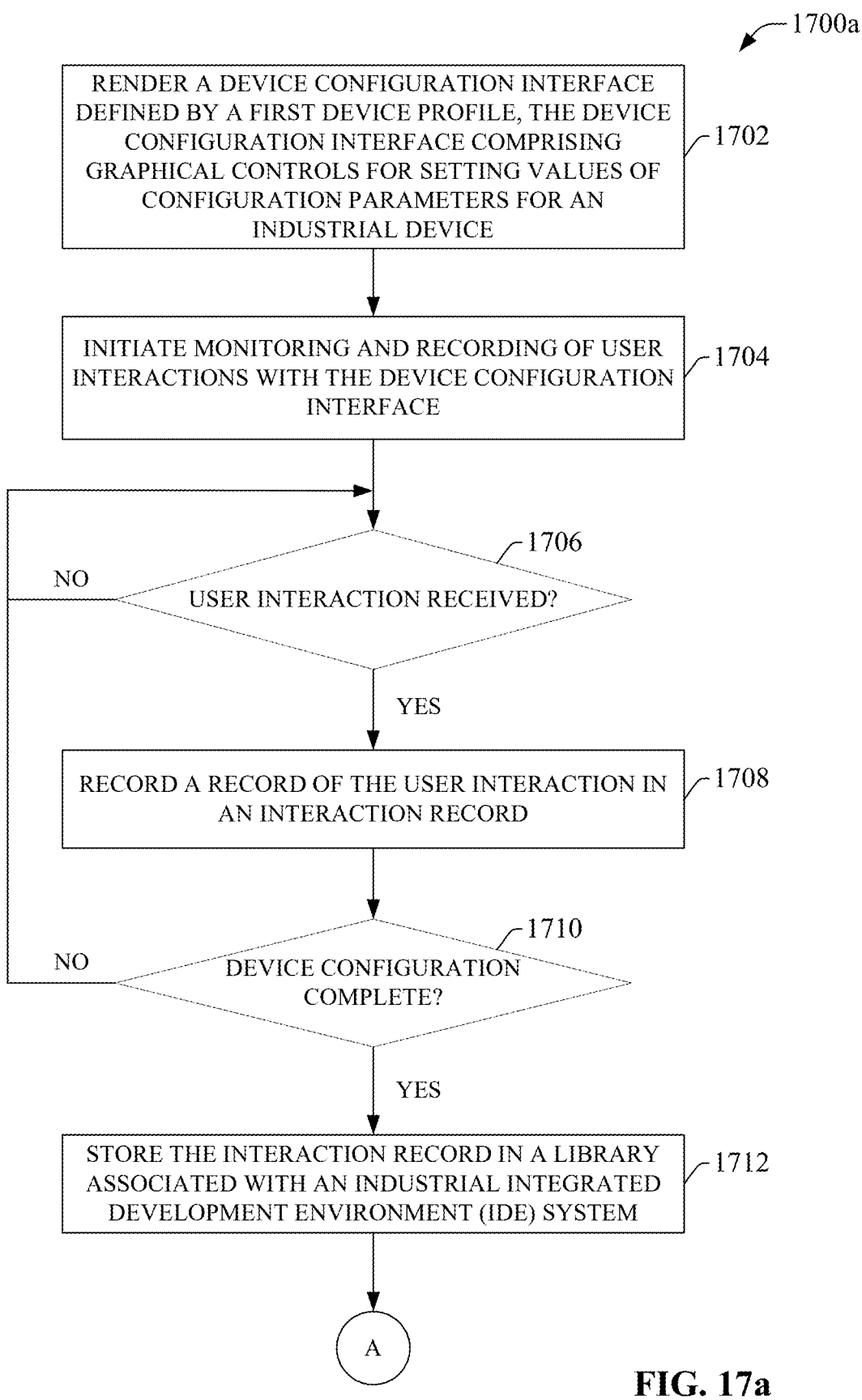
FIG. 17a is a flowchart of a first part of an example methodology for applying a device parameter edit made to a first device to one or more second devices within an industrial IDE environment.
Figure 17B:
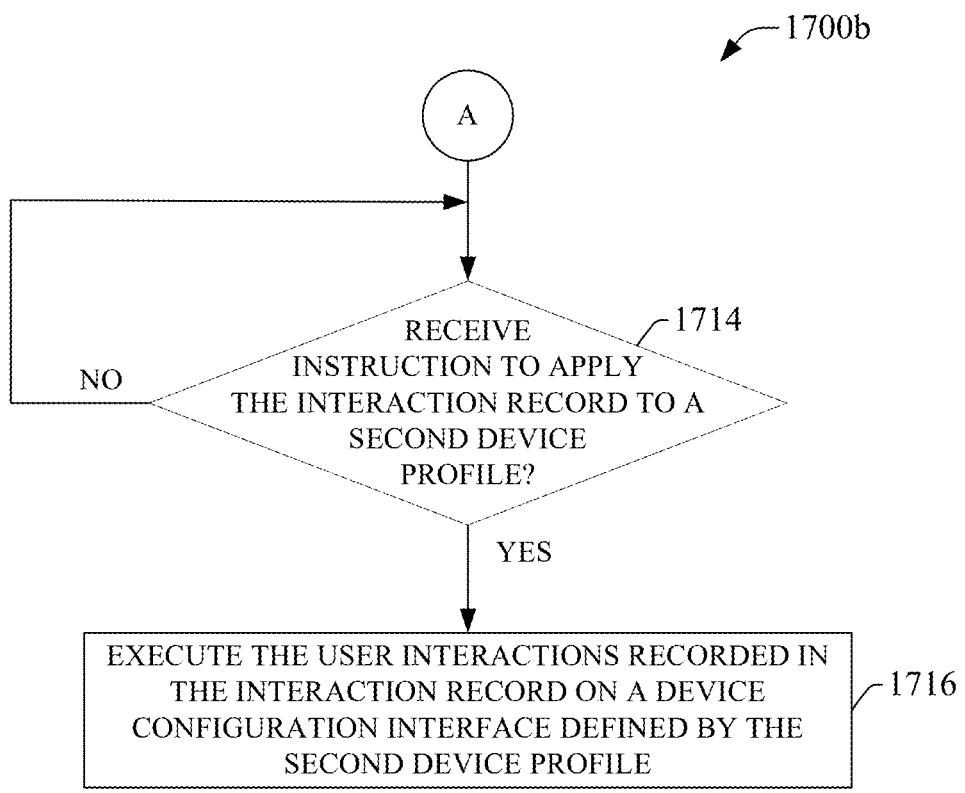
FIG. 17b is a flowchart of a second part of the example methodology for applying a device parameter edit made to a first device to one or more second devices within an industrial IDE environment.

FIGS. 17*a*-17*b* illustrate a methodology in accordance with one or more embodiments of the subject application. While, for purposes of simplicity of explanation, the methodology shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 17*a* illustrates a first part of an example methodology 1700*a* for applying a device parameter edit made to a first device to one or more second devices within an industrial IDE environment. Initially, at 1702, a device configuration interface defined by a first device profile is rendered by an industrial IDE system. The first device profile corresponds to a type of industrial device and defines graphical interface displays for viewing and editing values of configuration parameters for the device type. The device configuration interface comprises graphical controls—e.g., data entry fields, checkboxes, drop-down selection boxes, buttons, etc.—for setting values of configuration parameters for an industrial device defined in a control project being developed within the IDE system's development environment. At 1704, monitoring and recording of user interactions with the device configuration interface is initiated. This step monitors such user interactions as cursor movements, selection actions (e.g., mouse clicks), keystrokes, text highlighting, or other such interactions with the device configuration interface. These interactions can represent the user's actions in connection with navigating to, selecting, and editing one or more configuration parameters for an instance of the device type corresponding to the first device profile.

At 1706, a determination is made as to whether such a user interaction is received. If a user interaction with the device configuration interface is received (YES at step 1706), the methodology proceeds to step 1708, where a record of the user interaction is recorded in an interaction record. At 1710, a determination is made as to whether the current device configuration session is complete. For example, it may be determined that the current device configuration session is complete when the user closes the device configuration interface, or otherwise saves any edits applied to one or more of the configuration parameters made available for editing on the device configuration interface. If it the device configuration is not complete (NO at step 1710), the methodology returns to step 1706 and continues monitoring and recording the user interactions. If the device configuration session is complete (YES at step 1710), the methodology proceeds to step 1712, where the interaction record is stored in a library associated with the industrial IDE system. The interaction record defines the sequence of user interactions in the order in which they occurred and can be stored as a reusable object or file that can be selectively applied to device configuration interfaces defined by other device profiles.

The methodology then proceeds to the second part illustrated in FIG. 17b. At 1714, a determination is made as to whether an instruction to apply the interaction record to a second device profile is received. If such an instruction is received (YES at step 1714), the methodology proceeds to step 1716, where the user interactions recorded in the interaction record are executed on a device configuration interface defined by the second device profile, thereby reproducing, on the second device profile, the device parameter edits that were manually applied to the first device profile.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 18:
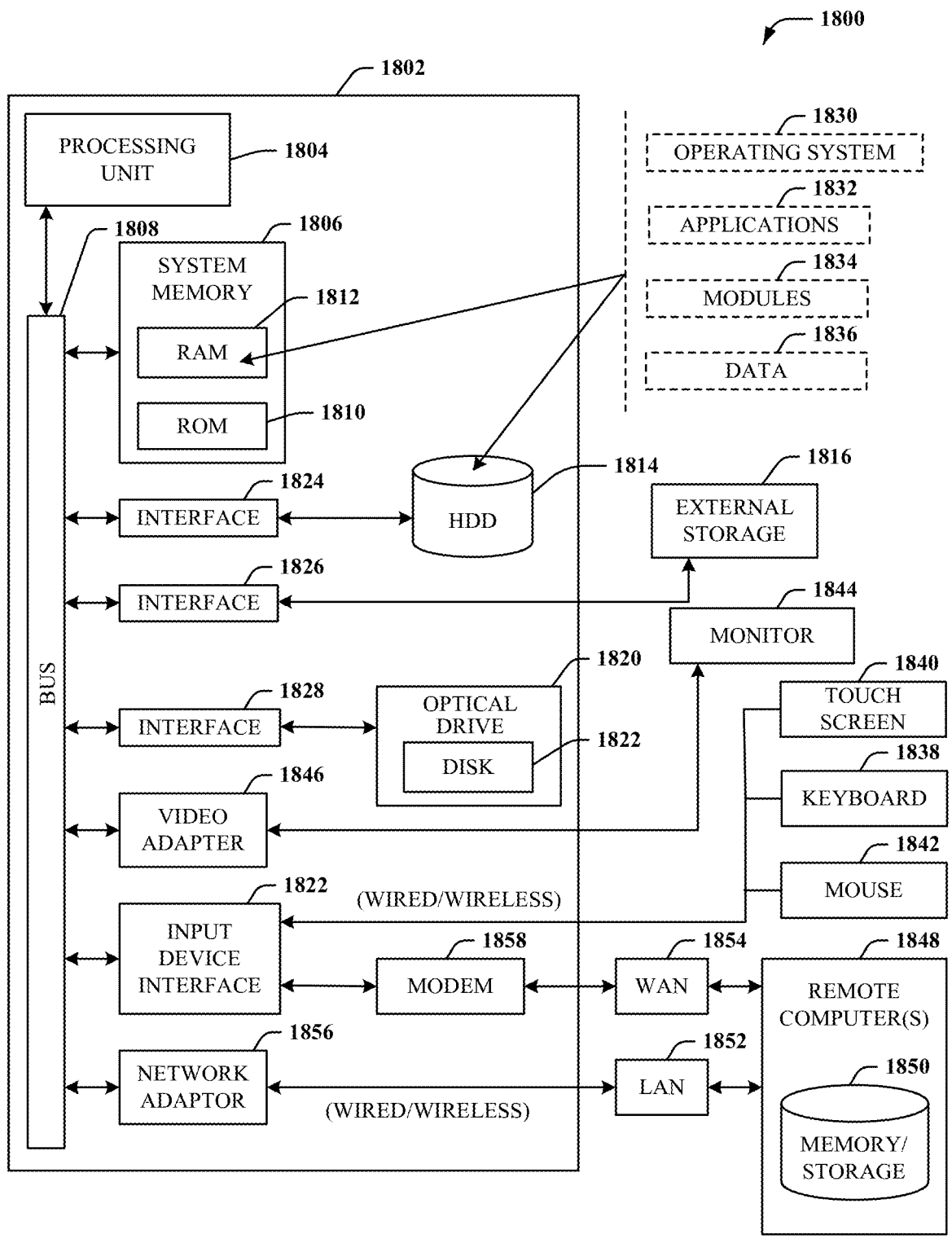
FIG. 18 is an example computing environment.
Figure 19:
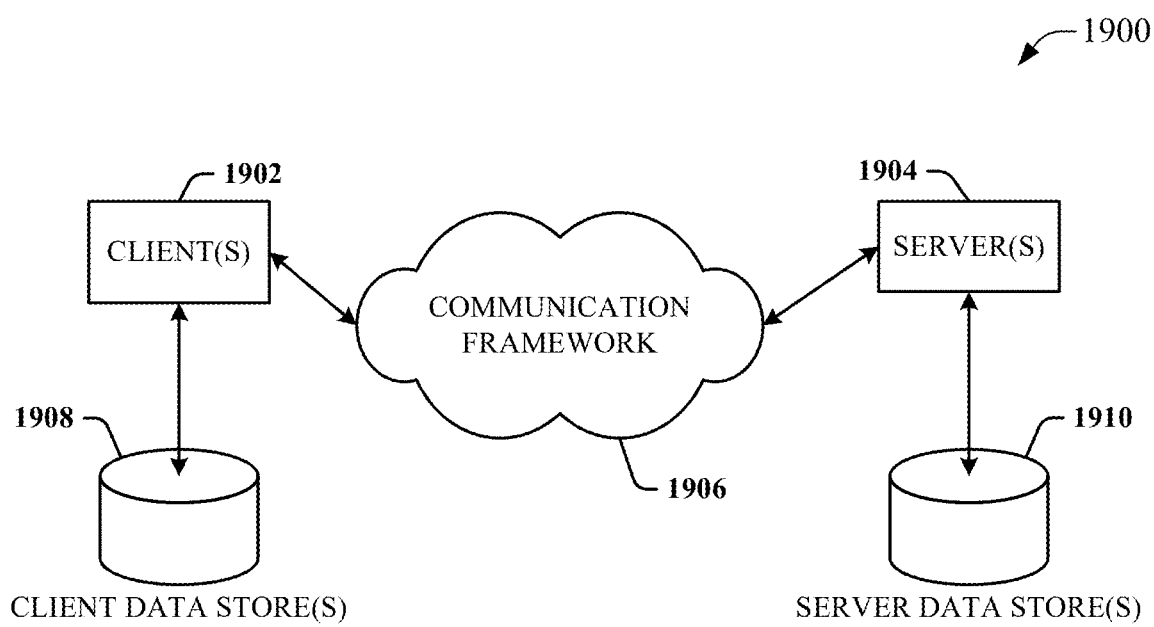
FIG. 19 is an example networking environment.

In order to provide a context for the various aspects of the disclosed subject matter, FIGS. 18 and 19 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 18, the example environment 1800 for implementing various embodiments of the aspects described herein includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures can also be employed as the processing unit 1804.

The system bus 1808 can be any of several types of bus structure that can further interconnect to a memory bus (with or without a memory controller), a peripheral bus, and a local bus using any of a variety of commercially available bus architectures. The system memory 1806 includes ROM 1810 and RAM 1812. A basic input/output system (BIOS) can be stored in a non-volatile memory such as ROM, erasable programmable read only memory (EPROM), EEPROM, which BIOS contains the basic routines that help to transfer information between elements within the computer 1802, such as during startup. The RAM 1812 can also include a high-speed RAM such as static RAM for caching data.

The computer 1802 further includes an internal hard disk drive (HDD) 1814 (e.g., EIDE, SATA), one or more external storage devices 1816 (e.g., a magnetic floppy disk drive (FDD) 1816, a memory stick or flash drive reader, a memory card reader, etc.) and an optical disk drive 1820 (e.g., which can read or write from a CD-ROM disc, a DVD, a BD, etc.). While the internal HDD 1814 is illustrated as located within the computer 1802, the internal HDD 1814 can also be configured for external use in a suitable chassis (not shown). Additionally, while not shown in environment 1800, a solid state drive (SSD) could be used in addition to, or in place of, an HDD 1814. The HDD 1814, external storage device(s) 1816 and optical disk drive 1820 can be connected to the system bus 1808 by an HDD interface 1824, an external storage interface 1826 and an optical drive interface 1828, respectively. The interface 1824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. The systems and methods described herein can be implemented utilizing various commercially available operating systems or combinations of operating systems.

Computer 1802 can optionally comprise emulation technologies. For example, a hypervisor (not shown) or other intermediary can emulate a hardware environment for operating system 1830, and the emulated hardware can optionally be different from the hardware illustrated in FIG. 18. In such an embodiment, operating system 1830 can comprise one virtual machine (VM) of multiple VMs hosted at computer 1802. Furthermore, operating system 1830 can provide runtime environments, such as the Java runtime environment or the .NET framework, for application programs 1832. Runtime environments are consistent execution environments that allow application programs 1832 to run on any operating system that includes the runtime environment. Similarly, operating system 1830 can support containers, and application programs 1832 can be in the form of containers, which are lightweight, standalone, executable packages of software that include, e.g., code, runtime, system tools, system libraries and settings for an application.

Further, computer 1802 can be enable with a security module, such as a trusted processing module (TPM). For instance with a TPM, boot components hash next in time boot components, and wait for a match of results to secured values, before loading a next boot component. This process can take place at any layer in the code execution stack of computer 1802, e.g., applied at the application execution level or at the operating system (OS) kernel level, thereby enabling security at any level of code execution.

A user can enter commands and information into the computer 1802 through one or more wired/wireless input devices, e.g., a keyboard 1838, a touch screen 1840, and a pointing device, such as a mouse 1842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1804 through an input device interface 1844 that can be coupled to the system bus 1808, but can be connected by other interfaces, such as a parallel port, an IEEE 1394 serial port, a game port, a USB port, an IR interface, a BLUETOOTH® interface, etc.

A monitor 1844 or other type of display device can be also connected to the system bus 1808 via an interface, such as a video adapter 1846. In addition to the monitor 1844, a computer typically includes other peripheral output devices (not shown), such as speakers, printers, etc.

The computer 1802 can operate in a networked environment using logical connections via wired and/or wireless communications to one or more remote computers, such as a remote computer(s) 1848. The remote computer(s) 1848 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1850 is illustrated. The logical connections depicted include wired/wireless connectivity to a local area network (LAN) 1852 and/or larger networks, e.g., a wide area network (WAN) 1854. Such LAN and WAN networking environments are commonplace in offices and companies, and facilitate enterprise-wide computer networks, such as intranets, all of which can connect to a global communications network, e.g., the Internet.

When used in a LAN networking environment, the computer 1802 can be connected to the local network 1852 through a wired and/or wireless communication network interface or adapter 1856. The adapter 1856 can facilitate wired or wireless communication to the LAN 1852, which can also include a wireless access point (AP) disposed thereon for communicating with the adapter 1856 in a wireless mode.

When used in a WAN networking environment, the computer 1802 can include a modem 1858 or can be connected to a communications server on the WAN 1854 via other means for establishing communications over the WAN 1854, such as by way of the Internet. The modem 1858, which can be internal or external and a wired or wireless device, can be connected to the system bus 1808 via the input device interface 1822. In a networked environment, program modules depicted relative to the computer 1802 or portions thereof, can be stored in the remote memory/storage device 1850. It will be appreciated that the network connections shown are example and other means of establishing a communications link between the computers can be used.

When used in either a LAN or WAN networking environment, the computer 1802 can access cloud storage systems or other network-based storage systems in addition to, or in place of, external storage devices 1816 as described above. Generally, a connection between the computer 1802 and a cloud storage system can be established over a LAN 1852 or WAN 1854 e.g., by the adapter 1856 or modem 1858, respectively. Upon connecting the computer 1802 to an associated cloud storage system, the external storage interface 1826 can, with the aid of the adapter 1856 and/or modem 1858, manage storage provided by the cloud storage system as it would other types of external storage. For instance, the external storage interface 1826 can be configured to provide access to cloud storage sources as if those sources were physically connected to the computer 1802.

The computer 1802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 19 is a schematic block diagram of a sample computing environment 1900 with which the disclosed subject matter can interact. The sample computing environment 1900 includes one or more client(s) 1902. The client(s) 1902 can be hardware and/or software (e.g., threads, processes, computing devices). The sample computing environment 1900 also includes one or more server(s) 1904. The server(s) 1904 can also be hardware and/or software (e.g., threads, processes, computing devices). The servers 1904 can house threads to perform transformations by employing one or more embodiments as described herein, for example. One possible communication between a client 1902 and servers 1904 can be in the form of a data packet adapted to be transmitted between two or more computer processes. The sample computing environment 1900 includes a communication framework 1906 that can be employed to facilitate communications between the client(s) 1902 and the server(s) 1904. The client(s) 1902 are operably connected to one or more client data store(s) 1908 that can be employed to store information local to the client(s) 1902. Similarly, the server(s) 1904 are operably connected to one or more server data store(s) 1910 that can be employed to store information local to the servers 1904.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for developing industrial applications, comprising:
   a memory that stores executable components; and
   a processor, operatively coupled to the memory, that executes the executable components, the executable components comprising:

a user interface component configured to render, in response to selection of a first device profile from a library of device profiles, a first device configuration interface defined by the first device profile, wherein the first device configuration interface is configured to set, based on a sequence of user interactions with the first device configuration interface, values of one or more device parameters of a first industrial device represented by the first device profile;

a device configuration component configured to
  record the sequence of user interactions as an interaction record, wherein the user interactions comprise at least one of a cursor movement, a selection action, or a series of keystrokes,
  in response to receipt of an instruction to apply the interaction record to an instance of a second device profile, execute the sequence of user interactions on a second device configuration interface defined by the second device profile, and
  for a user interaction recorded in the interaction record representing an edit to a value of a device parameter that is located at a first location on the first device configuration interface, and in response to a determination that a second location on the second device configuration interface corresponding to the first location does not correlate with a device parameter,
    infer the edit to the value of the device parameter intended by the user interaction, and
    apply the edit to the value of the device parameter on the second device configuration interface;

a project generation component configured to generate system project data based on the values of the one or more device parameters set via the first device configuration interface and the second device configuration interface; and a project deployment component configured to translate the system project data to an executable industrial control program and device configuration settings, and to deploy the executable industrial control program and the device configuration settings to one or more industrial devices, wherein, in response to execution on the one or more industrial devices, the executable industrial control program and device configuration settings configure the one or more industrial devices to monitor and control an industrial automation system.

2. The system of claim 1, wherein application of the interaction record to the instance of the second device profile reproduces, on the second device configuration interface, edits to the one or more device parameters performed on the first device configuration interface.

3. The system of claim 1, wherein the device configuration component is configured to store the interaction record as an automation object or as a property of an automation object.

4. The system of claim 1, wherein the user interactions at least one of navigate between views of the first device configuration interface, select graphical controls representing the one or more device parameters, or enter values of the one or more device parameters.

5. The system of claim 1, wherein the device configuration component is further configured to encrypt the interaction record.

6. The system of claim 1, wherein the device configuration component is configured to permit application of the interaction record to the instance of the second device profile conditional on receipt of valid user credential data.

7. The system of claim 1, wherein the device configuration component is configured to identify one or more redundant user interactions of the sequence of user interactions, and to omit the one or more redundant user interactions from the interaction record.

8. The system of claim 1, wherein the one or more device parameters comprise at least one of a network setting, a communication setting, a scale factor, an input or output signal type, an operating mode setting, a tuning parameter value, a maximum or minimum value, a refresh rate, or a channel configuration.

9. A method, comprising:
  rendering, by a system comprising a processor in response to selection of a first device profile from a library of device profiles, a first device configuration interface defined by the first device profile;
  receiving, by the system, a sequence of user actions directed to the first device configuration interface, wherein the user interactions comprise at least one of a cursor movement, a selection action, or a series of keystrokes;
  setting, by the system based on a sequence of user interactions, values of one or more device parameters of a first industrial device represented by the first device profile;
  storing, by the system, the sequence of user interactions in an interaction record;
  in response to receiving an instruction to apply the interaction record to an instance of a second device profile, recreating, by the system, the sequence of user interactions on a second device configuration interface defined by the second device profile, wherein the recreating comprises:
    for a user interaction recorded in the interaction record representing an edit to a value of a device parameter that is located at a first location on the first device configuration interface, and in response to determining that a second location on the second device configuration interface corresponding to the first location does not correlate with a device parameter:
      inferring the edit to the value of the device parameter intended by the user interaction, and
      applying the edit to the value of the device parameter on the second device configuration interface;
  generating, by the system, system project data based on the values of the one or more device parameters set via the first device configuration interface and the second device configuration interface;
  translating, by the system, the system project data to an executable industrial control program and device configuration settings; and
  sending, by the system, the executable industrial control program and the device configuration settings to one or more industrial devices,
  wherein the executable industrial control program and the device configuration settings configure the one or more industrial control device to monitor and control an industrial automation system.

10. The method of claim 9, wherein the recreating of the sequence of user interactions on the second device configuration interface reproduces, on the second device configuration interface, edits to the one or more device parameters performed on the first device configuration interface.

11. The method of claim 9, wherein the storing comprises encapsulating the interaction record as an automation object or as a property of an automation object.

12. The method of claim 9, wherein the receiving of the sequence of user interactions comprises receiving at least one of a navigation between views of the first device configuration interface, selection of graphical controls representing the one or more device parameters, or submission of values of the one or more device parameters.

13. The method of claim 9, wherein the storing comprises encrypting the interaction record.

14. The method of claim 9, wherein the recreating comprises permitting application of the interaction record to the instance of the second device profile conditional on receipt of valid user credential data.

15. The method of claim 9, wherein the storing comprises:
identifying one or more redundant user interactions of the sequence of user interactions, and
omitting the one or more redundant user interactions from the interaction record.

16. The method of claim 9, wherein the one or more device parameters comprise at least one of a network setting, a communication setting, a scale factor, an input or output signal type, an operating mode setting, a tuning parameter value, a maximum or minimum value, a refresh rate, or a channel configuration.

17. A non-transitory computer-readable medium having stored thereon instructions that, in response to execution, cause a system comprising a processor to perform operations, the operations comprising:
in response to selection of a first device profile from a library of device profiles, rendering a first device configuration interface defined by the first device profile;
receiving a sequence of user actions directed to the first device configuration interface, wherein the user interactions comprise at least one of a cursor movement, a selection action, or a series of keystrokes;
setting, based on a sequence of user interactions, values of one or more device parameters of a first industrial device represented by the first device profile;
storing the sequence of user interactions in an interaction record; and
in response to receiving an instruction to apply the interaction record to an instance of a second device profile, reproducing the sequence of user interactions on a second device configuration interface defined by the second device profile, wherein the reproducing comprises:
for a user interaction recorded in the interaction record representing an edit to a value of a device parameter that is located at a first location on the first device configuration interface, and in response to determining that a second location on the second device configuration interface corresponding to the first location does not correlate with a device parameter:
inferring the edit to the value of the device parameter intended by the user interaction, and
applying the edit to the value of the device parameter on the second device configuration interface;
generating, by the system, system project data based on the values of the one or more device parameters set via the first device configuration interface and the second device configuration interface;
translating the system project data to an executable industrial control program and device configuration settings; and
deploying the executable industrial control program and the device configuration settings to one or more industrial devices
wherein the executable industrial control program and device configuration settings configure the one or more industrial control device to monitor and control an industrial automation system.

18. The non-transitory computer-readable medium of claim 17, wherein the reproducing of the sequence of user interactions on the second device configuration interface reproduces, on the second device configuration interface, edits to the one or more device parameters performed on the first device configuration interface.

19. The non-transitory computer-readable medium of claim 17, wherein the receiving of the sequence of user interactions comprises receiving at least one of a navigation between views of the first device configuration interface, selection of graphical controls representing the one or more device parameters, or submission of values of the one or more device parameters.

20. The non-transitory computer-readable medium of claim 17, wherein the storing comprises:
identifying one or more redundant user interactions of the sequence of user interactions, and
omitting the one or more redundant user interactions from the interaction record.

* * * * *